(12) United States Patent
Clements

(10) Patent No.: US 9,616,371 B1
(45) Date of Patent: Apr. 11, 2017

(54) CARTRIDGE FILTER WITH FLOW TRANSITION INSERT

(71) Applicant: IFIL USA, LLC, Harrisonville, MO (US)

(72) Inventor: Jack T Clements, Lees Summit, MO (US)

(73) Assignee: iFIL USA, LLC, Harrisonville, MO (US)

( * ) Notice: Subject to any disclaimer, the term of this patent is extended or adjusted under 35 U.S.C. 154(b) by 463 days.

(21) Appl. No.: 14/270,698

(22) Filed: May 6, 2014

(51) Int. Cl.
    *B01D 46/00* (2006.01)
    *B01D 46/52* (2006.01)

(52) U.S. Cl.
    CPC ..... *B01D 46/0068* (2013.01); *B01D 46/0005* (2013.01); *B01D 46/521* (2013.01)

(58) Field of Classification Search
CPC B01D 46/00; B01D 46/0068; B01D 46/0005; B01D 46/521
USPC ...................................... 55/378–379; 95/281
See application file for complete search history.

(56) References Cited

U.S. PATENT DOCUMENTS

| | | |
|---|---|---|
| 1,012,122 A | 12/1911 | Budil |
| 1,743,934 A | 1/1930 | Ruemelin |
| 1,847,368 A | 3/1932 | Wendler |
| 2,072,906 A | 3/1937 | Rosenberger |
| 2,308,309 A | 1/1943 | Ruemelin et al. |
| 2,308,310 A | 1/1943 | Ruemelin et al. |
| 2,335,315 A | 11/1943 | Seymour |
| 2,503,568 A | 4/1950 | Timm |
| 2,927,659 A | 3/1960 | Pabst |
| 2,952,332 A | 9/1960 | Metro |
| 2,981,368 A | 4/1961 | Johnson |
| 3,167,415 A | 1/1965 | Edwards |
| 3,170,777 A | 2/1965 | Held |
| 3,243,940 A | 4/1966 | Larson |
| 3,421,295 A | 1/1969 | Swift et al. |
| 3,524,304 A | 8/1970 | Wittemeier et al. |
| 3,550,359 A | 12/1970 | Fisher et al. |
| 3,716,436 A | 2/1973 | Pall et al. |
| 3,747,305 A | 7/1973 | O'Dell et al. |
| 3,765,152 A | 10/1973 | Fausch |

(Continued)

FOREIGN PATENT DOCUMENTS

| | | |
|---|---|---|
| EP | 0213930 | 3/1987 |
| EP | 0520737 | 12/1992 |

(Continued)

*Primary Examiner* — T. Bennett McKenzie
(74) *Attorney, Agent, or Firm* — Joseph B Bowman

(57) ABSTRACT

A high efficiency, stepped-top cartridge filter with a separate flow transition insert for installation in a uniform circular or oblong hole of a baghouse tube sheet. The cartridge includes a tubular core supporting a tube of pleated filter media to form a pleat pack having a molded cap at its lower end A open-mouthed, molded top fitting includes an upper flange, a side wall and a stepped portion leading to the bore of the filter. The flow transition insert is pressed into the top fitting to create a seal with the hole in the tube sheet. The insert includes an aerodynamically contoured mouth leading to a bore corresponding to the bore of the filter and further defines an air passageway between the top fitting and the insert for supplying tertiary cleaning air to supplement the primary and secondary air flows during a cleaning cycle.

20 Claims, 17 Drawing Sheets

(56) References Cited

U.S. PATENT DOCUMENTS

| | | | |
|---|---|---|---|
| 3,774,458 A | 11/1973 | Kital et al. | |
| 3,774,769 A | 11/1973 | Smith | |
| 3,791,111 A | 2/1974 | Kroll | |
| 3,826,066 A | 7/1974 | Higgins | |
| 3,830,042 A | 8/1974 | MacDonald | |
| 3,837,151 A | 9/1974 | Jensen | |
| 3,853,509 A | 12/1974 | Leliaert | |
| 3,876,402 A | 4/1975 | Bundy et al. | |
| 3,942,962 A | 3/1976 | Duyckinck | |
| 3,997,305 A | 12/1976 | Ulvestad et al. | |
| 4,007,026 A | 2/1977 | Groh | |
| 4,073,632 A | 2/1978 | Reinauer et al. | |
| 4,105,421 A | 8/1978 | Rheinfrank, Jr. et al. | |
| 4,159,197 A | 6/1979 | Schuler et al. | |
| 4,187,091 A | 2/1980 | Durre et al. | |
| 4,218,227 A | 8/1980 | Frey | |
| 4,219,343 A | 8/1980 | Peterson | |
| 4,247,314 A | 1/1981 | Smoluchowski et al. | |
| 4,256,473 A | 3/1981 | De Martino | |
| 4,270,935 A | 6/1981 | Reinauer et al. | |
| 4,272,263 A | 6/1981 | Hancock | |
| 4,276,069 A | 6/1981 | Miller | |
| 4,291,904 A | 9/1981 | Iversen et al. | |
| 4,292,057 A | 9/1981 | Ulvestad et al. | |
| 4,312,648 A | 1/1982 | Day | |
| 4,319,897 A | 3/1982 | Labadie | |
| 4,322,231 A | 3/1982 | Hilzendeger et al. | |
| 4,344,781 A | 8/1982 | Higgins et al. | |
| 4,388,086 A * | 6/1983 | Bauer | B01D 46/30 55/441 |
| 4,424,070 A | 1/1984 | Robinson | |
| 4,436,536 A | 3/1984 | Robinson | |
| 4,443,237 A | 4/1984 | Ulvestad et al. | |
| 4,445,915 A | 5/1984 | Robinson | |
| 4,560,477 A | 12/1985 | Moldow | |
| 4,632,680 A | 12/1986 | Klimczak | |
| 4,655,806 A | 4/1987 | Bowersox | |
| 4,663,041 A | 5/1987 | Miyagi et al. | |
| 4,732,678 A | 3/1988 | Humbert, Jr. | |
| 4,813,985 A | 3/1989 | Brennecke et al. | |
| 4,878,930 A | 11/1989 | Manniso et al. | |
| 4,929,354 A | 5/1990 | Meyering et al. | |
| 4,954,255 A | 9/1990 | Muller et al. | |
| 5,074,896 A | 12/1991 | Baert et al. | |
| 5,173,098 A | 12/1992 | Pipkorn | |
| 5,207,811 A | 5/1993 | Buonpastore | |
| 5,207,812 A | 5/1993 | Tronto et al. | |
| 5,211,846 A | 5/1993 | Kott et al. | |
| 5,222,488 A | 6/1993 | Forsgren | |
| 5,290,441 A | 3/1994 | Griffin et al. | |
| 5,290,446 A | 3/1994 | Degen et al. | |
| 5,308,369 A | 5/1994 | Morton et al. | |
| 5,336,405 A | 8/1994 | Tang et al. | |
| 5,536,290 A | 7/1996 | Stark et al. | |
| 5,632,791 A | 5/1997 | Oussoren et al. | |
| 5,730,766 A | 3/1998 | Clements | |
| 5,746,792 A | 5/1998 | Clements et al. | |
| 5,885,314 A | 3/1999 | Oussoren et al. | |
| 5,928,414 A * | 7/1999 | Wnenchak | B01D 39/1692 55/302 |
| 5,964,909 A * | 10/1999 | Brunner | B01D 46/2411 210/450 |
| 6,017,378 A | 1/2000 | Oussoren et al. | |
| 6,203,591 B1 | 3/2001 | Clements et al. | |
| RE37,163 E | 5/2001 | Oussoren et al. | |
| 6,358,292 B1 | 3/2002 | Clements et al. | |
| 6,375,698 B1 | 4/2002 | Clements et al. | |
| 6,440,188 B1 | 8/2002 | Clements et al. | |
| 6,676,722 B1 | 1/2004 | Clements et al. | |
| 6,726,735 B1 | 4/2004 | Oussoren et al. | |
| 6,858,052 B2 | 2/2005 | Clements | |
| 7,186,284 B2 | 3/2007 | Clements | |
| 7,585,343 B2 | 9/2009 | Clements | |
| D626,208 S | 10/2010 | Clements | |
| 7,927,392 B2 | 4/2011 | Clements et al. | |
| 8,580,004 B1 | 11/2013 | Clements | |

FOREIGN PATENT DOCUMENTS

| | | |
|---|---|---|
| GB | 242388 | 11/1925 |
| GB | 636439 | 4/1950 |
| GB | 840570 | 7/1960 |
| GB | 990587 | 4/1965 |
| GB | 1016556 | 1/1966 |
| GB | 1081516 | 8/1967 |
| GB | 0160168 | 11/1985 |
| GB | 0213930 | 3/1987 |
| GB | 2195558 | 4/1988 |
| GB | 0520737 | 12/1992 |
| WO | WO 85/05286 | 12/1985 |

\* cited by examiner

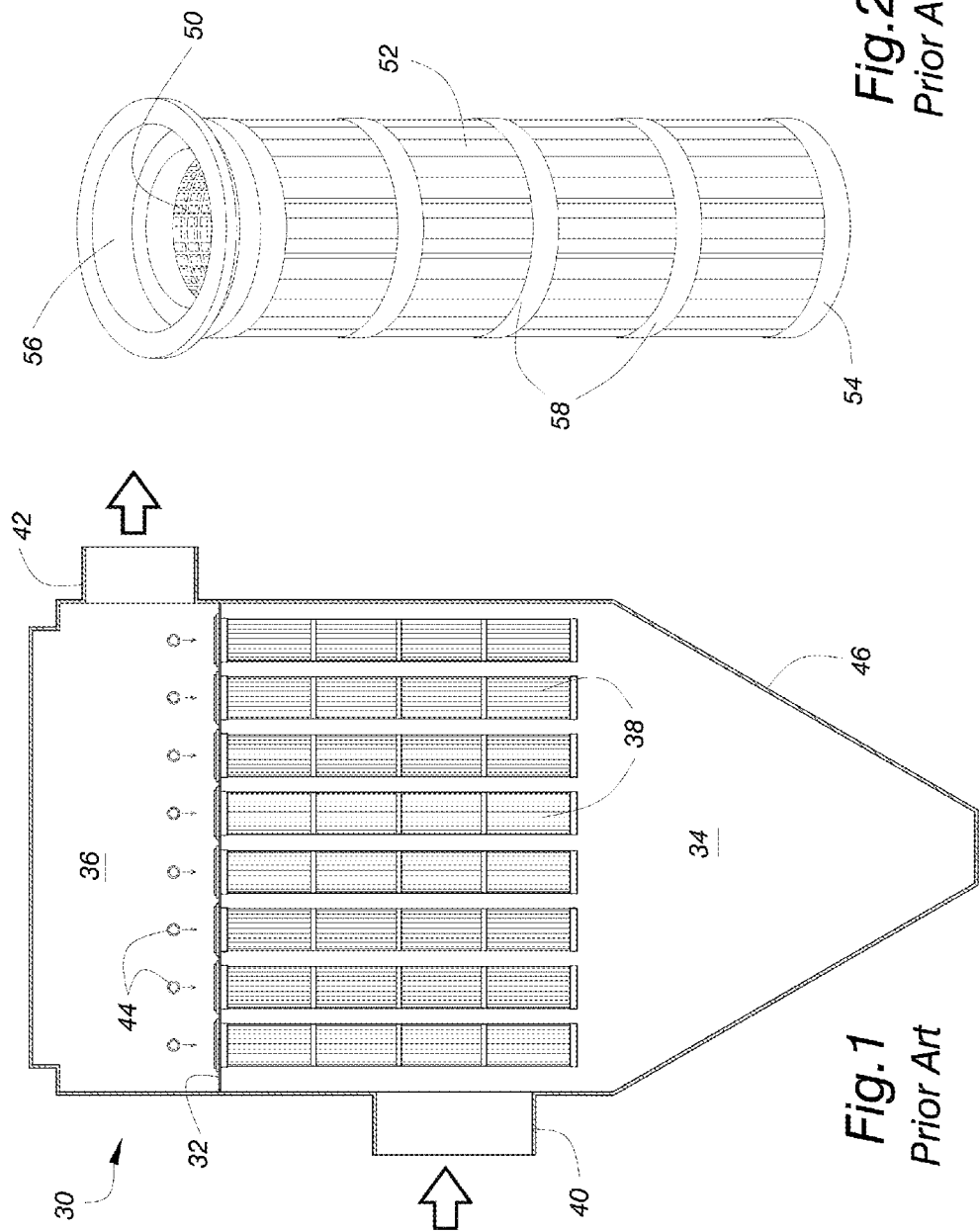

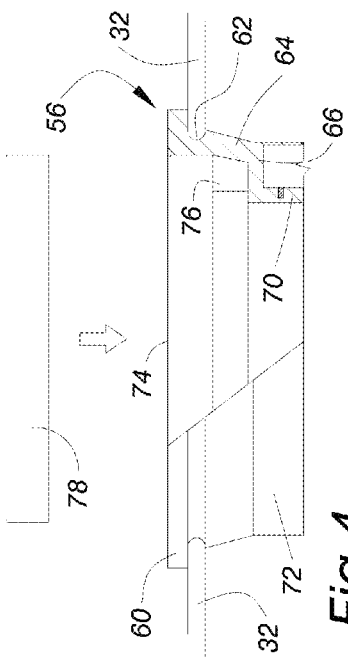
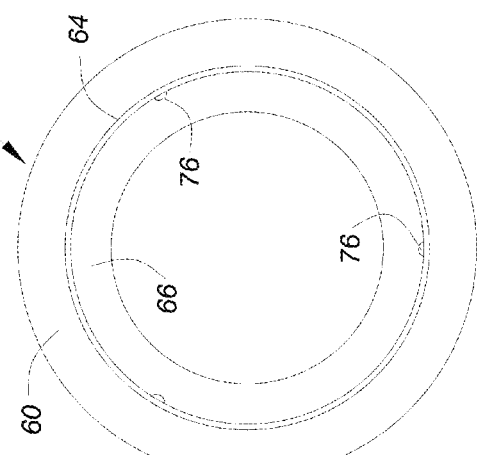
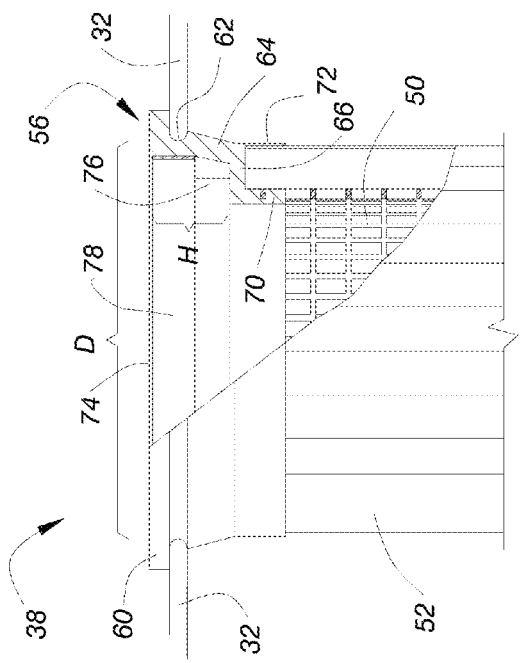
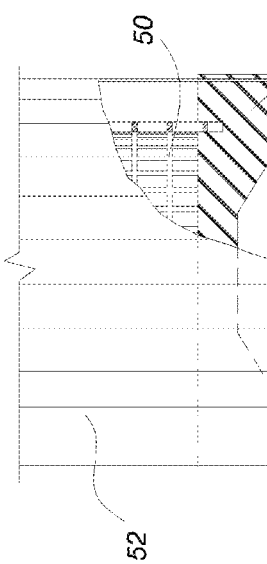
Fig.3 Prior Art
Fig.4 Prior Art
Fig.5 Prior Art

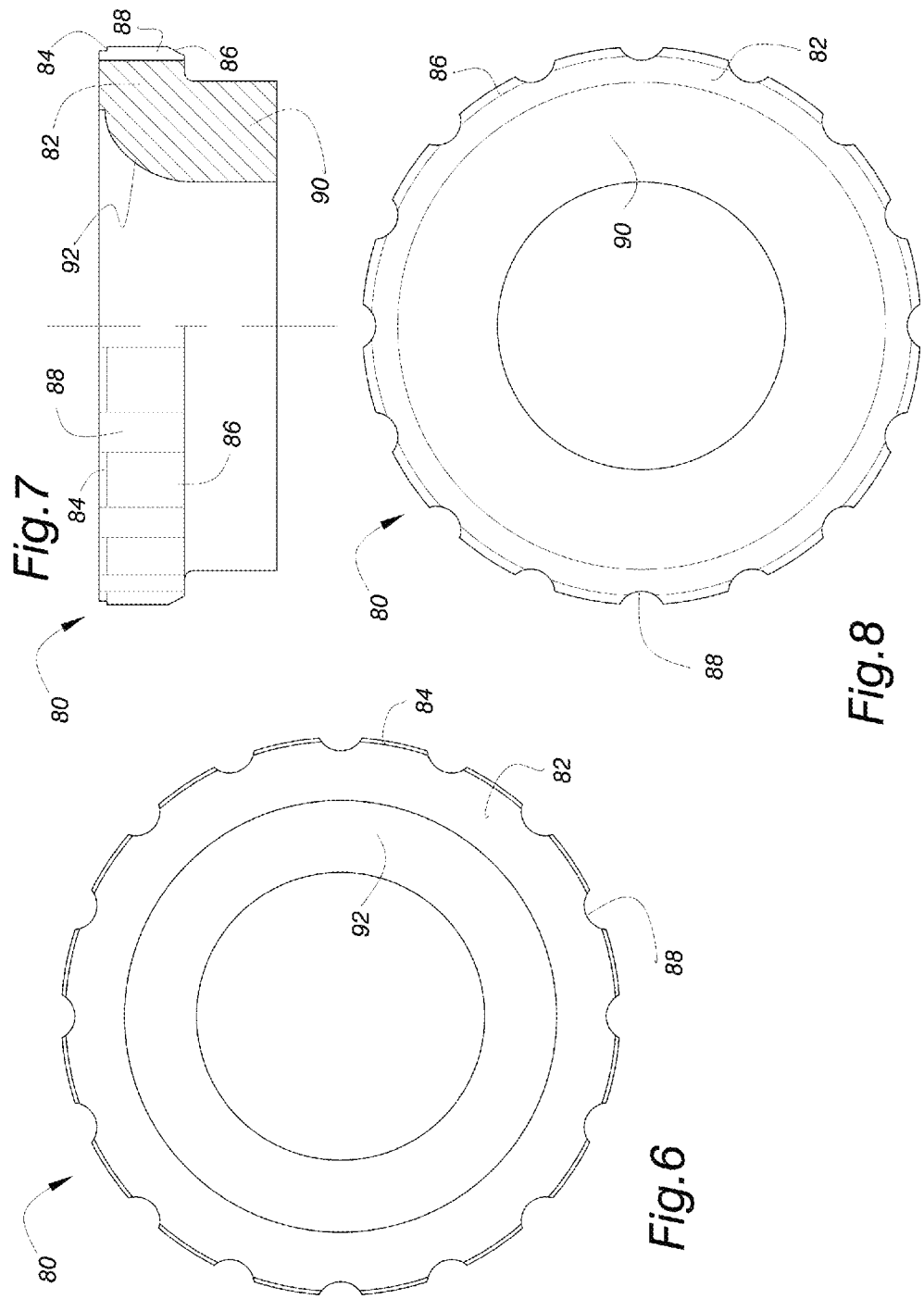

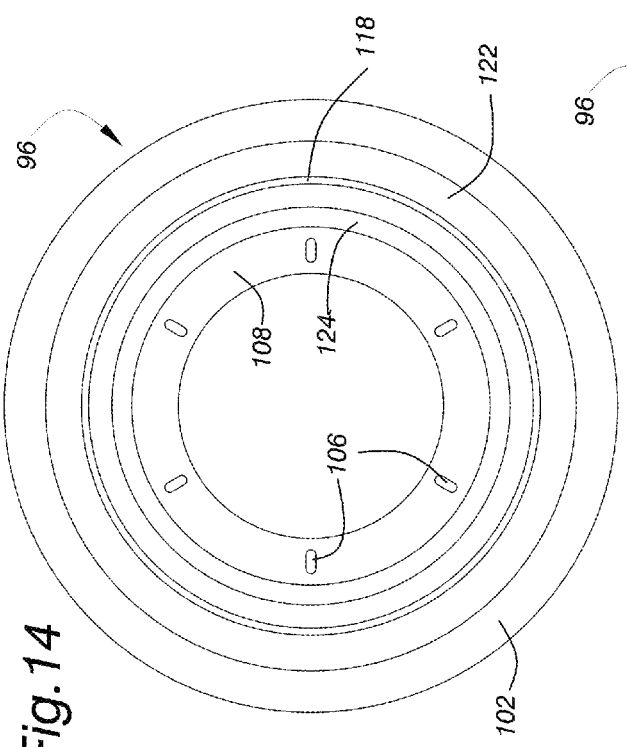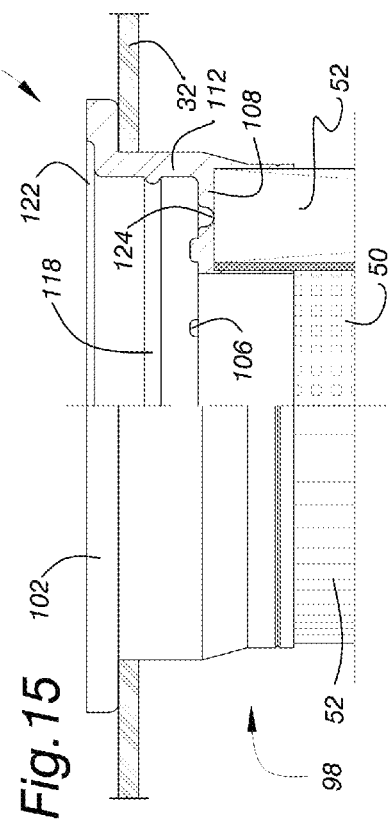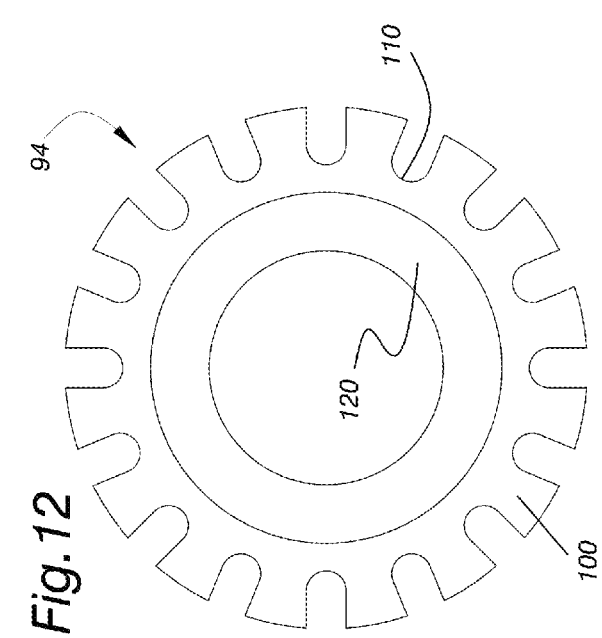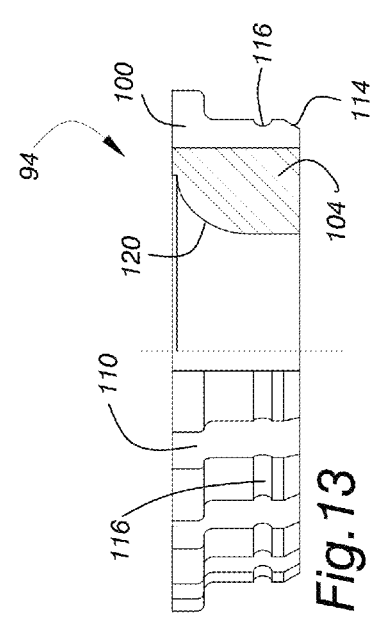

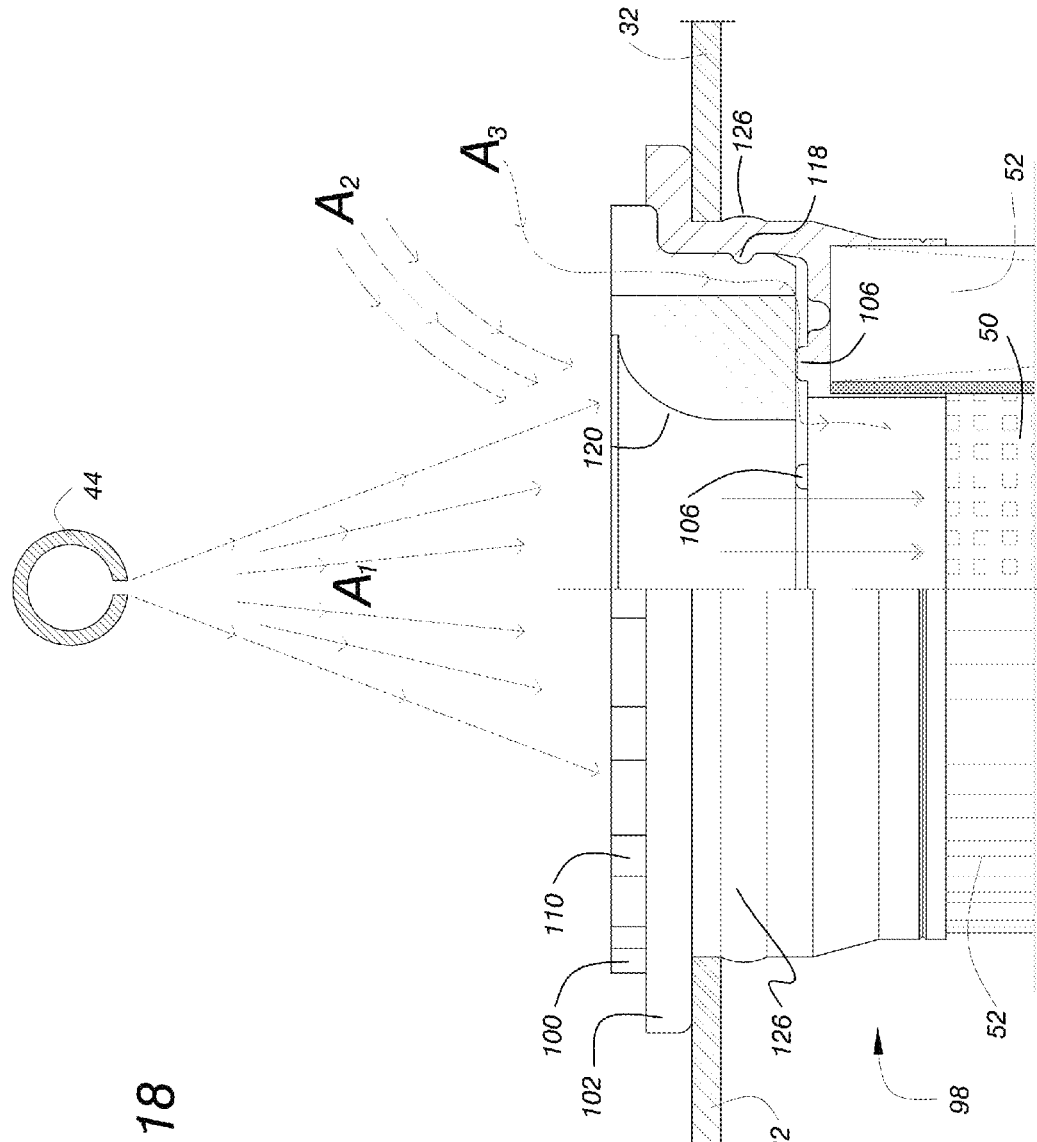

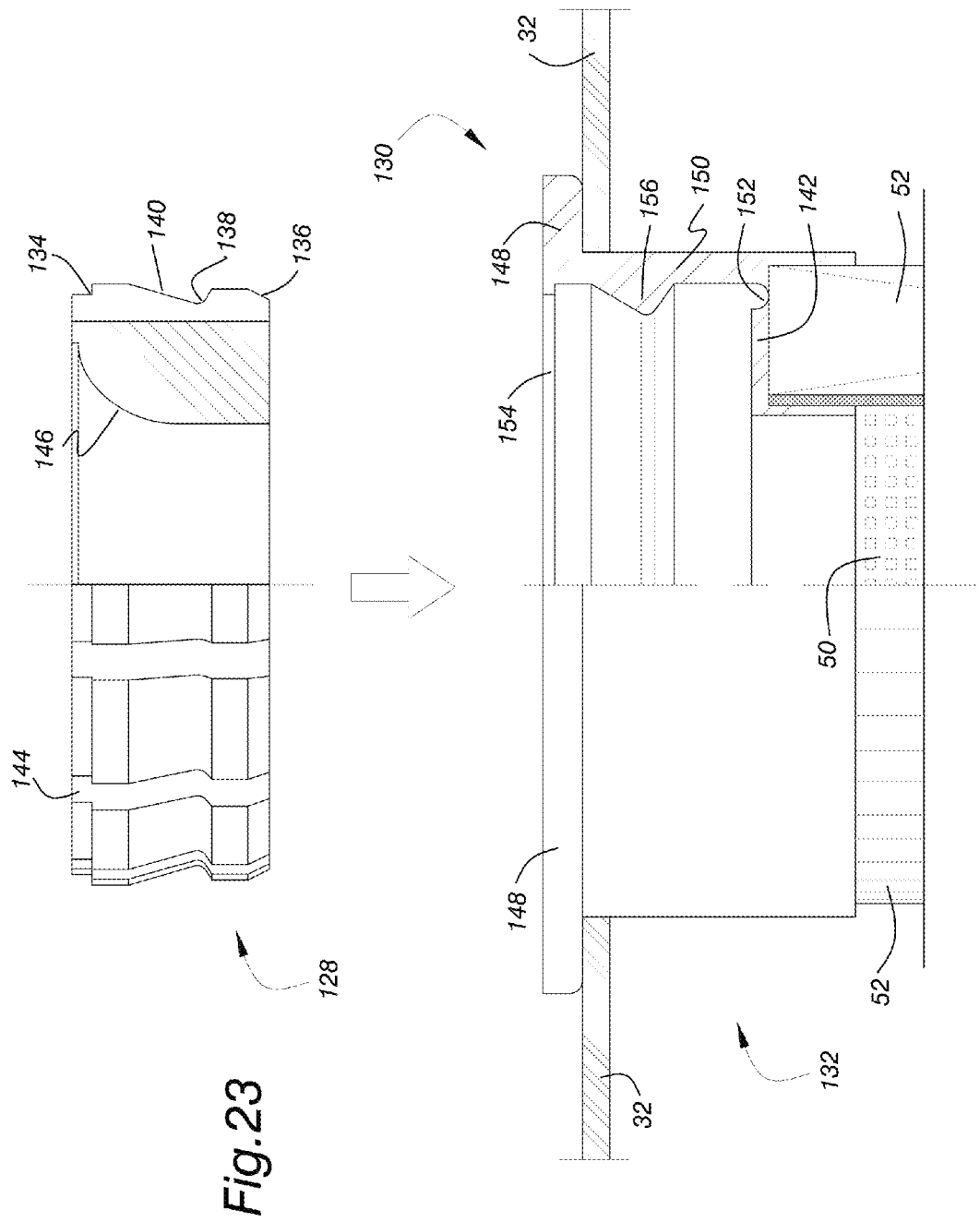

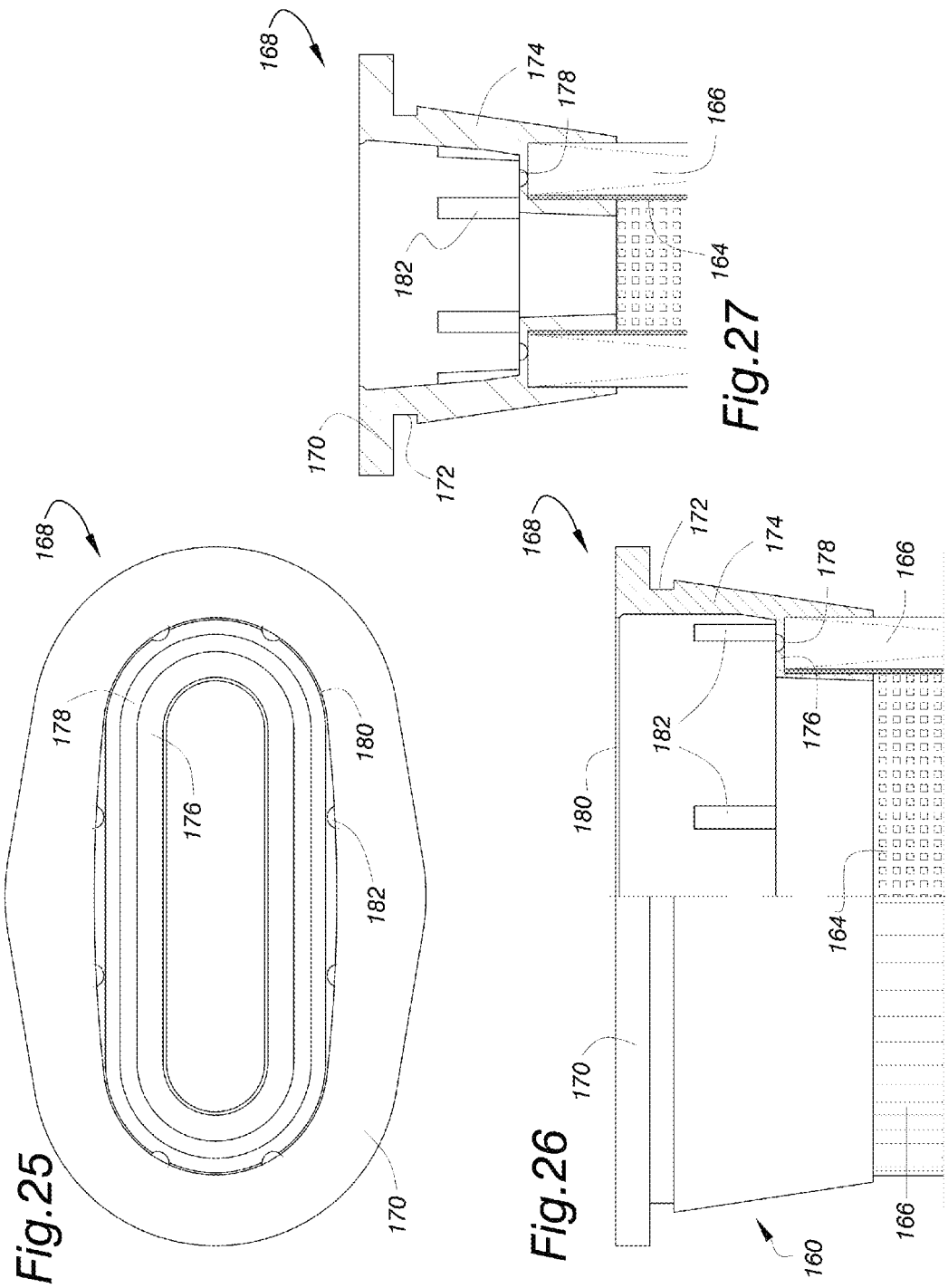

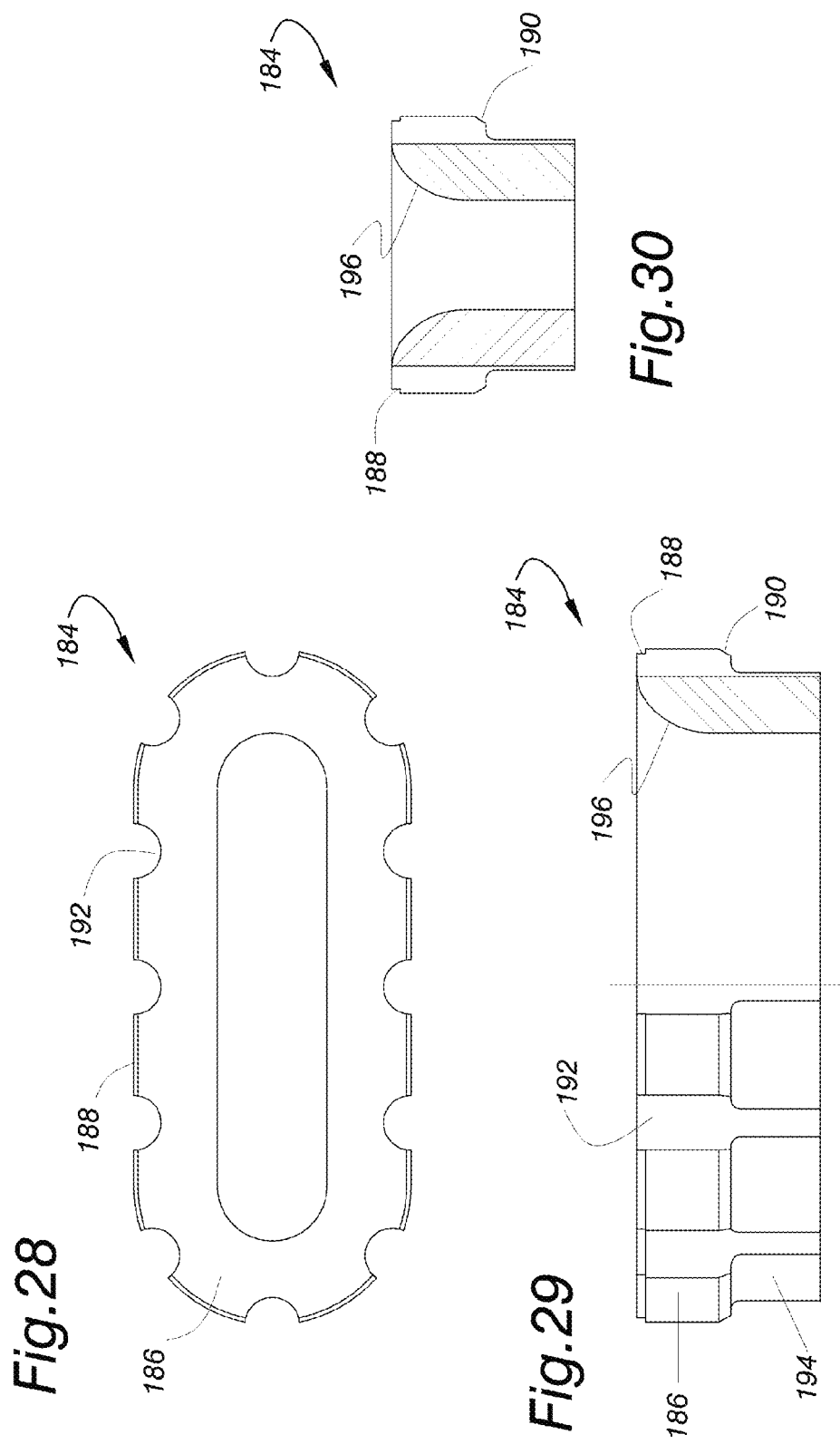

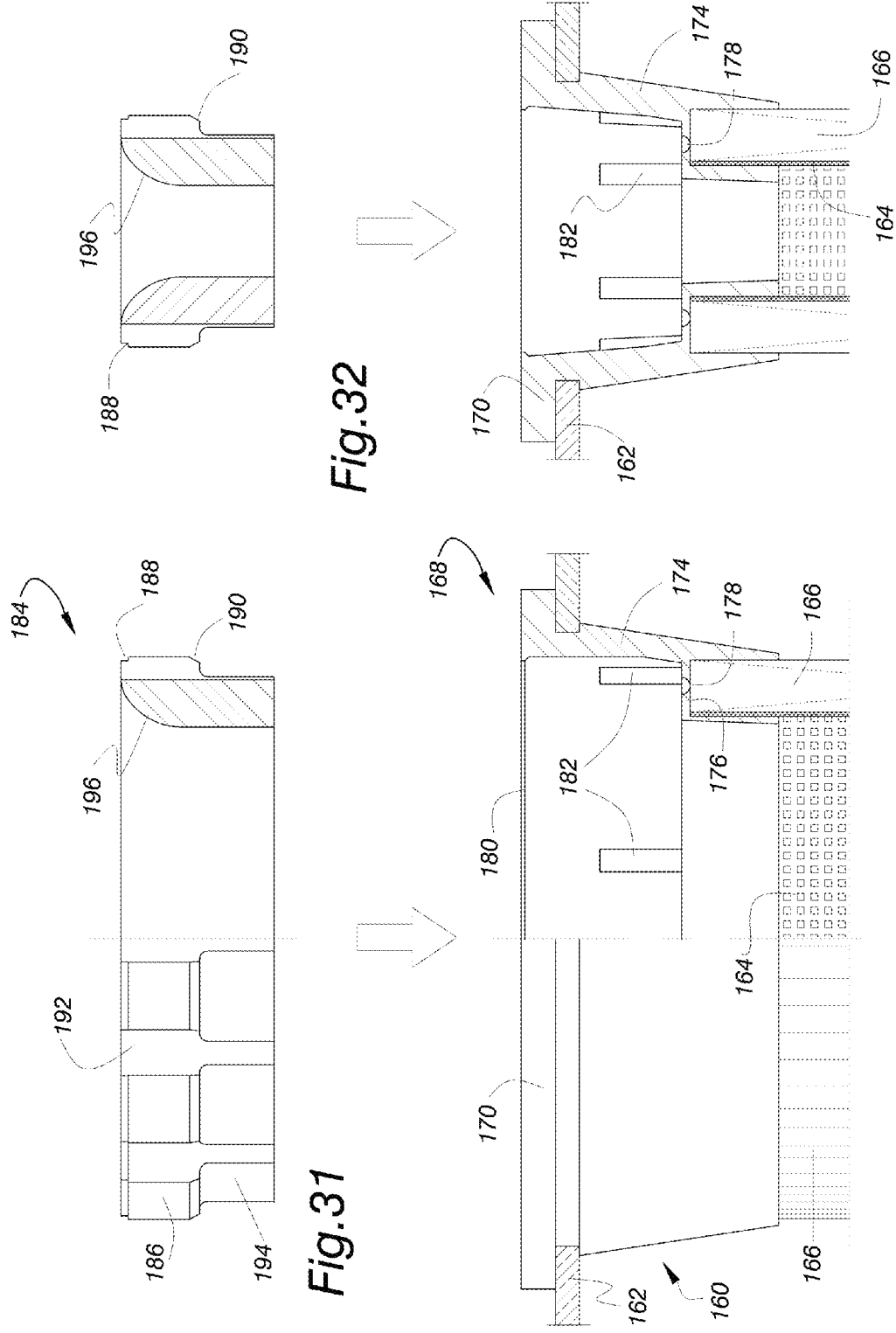

CARTRIDGE FILTER WITH FLOW TRANSITION INSERT

CROSS-REFERENCE TO RELATED APPLICATIONS

This application has no related applications.

STATEMENT REGARDING FEDERALLY SPONSORED RESEARCH OR DEVELOPMENT

The inventions described and claimed in this application were not made under federally sponsored research and development.

BACKGROUND OF THE INVENTION

The present invention generally relates to cartridge filters for a pulse-jet industrial baghouse. More specifically, the invention relates to a cartridge filter with a separate, aerodynamic flow transition insert for improved filtering and cleaning performance and for securely sealing the cartridge filter to the tube sheet of the baghouse.

Continuous emphasis on environmental quality has resulted in increasingly strenuous regulatory controls on industrial emissions. One technique which has proven highly effective in controlling air pollution has been separation of undesirable particulate matter from a gas stream by fabric filtration. Such filtration is carried out in dust collection apparatus known in the trade as a "baghouse" which operates on the same general principle as an ordinary household vacuum cleaner, except on a much larger scale. Basically, the baghouse is a sheet metal housing divided into two chambers, referred to as plenums, by a tube sheet. Disposed within uniform openings in the tube sheet are elongate filters. A particulate laden gas stream induced by the action of a fan, flows into one chamber (dirty air plenum) wherein dust accumulates on the filter media as the gas passes through the filter into the other plenum (clean air plenum) and out an exhaust.

Although all baghouses are designed in accordance with the foregoing general principles, there are numerous operational and structural distinctions including numerous differences in the construction of the filters themselves. The present invention relates to a baghouse with uniformly sized openings in the tube sheet adapted for use with cartridge filters.

A modern cartridge filter characteristically includes a central structural tube or core manufactured from a foraminous plastic or metal material. Circumscribing the central core is a tube of pleated filter media. A molded bottom end cap terminates the lower ends of both the core and filter media, commonly referred to as the pleat pack. The upper end of the pleat pack is terminated with an open mouthed, molded fitting sealed in one of several manners with the tube sheet. Filtration of the process gas therefore occurs from outside to inside of the filters (i.e., the dust collects on the outside surface of the pleated filter media) as the gas passes through the filter media, through the tubular core material and up to the dirty air plenum.

During continuous operation of the baghouse, the filters must be periodically cleaned and the accumulated dust removed. In a pulse-jet baghouse, cleaning is accomplished by delivering a short blast of high pressure air into the mouth of an individual filter cartridge. The higher pressure cleaning air temporarily overcomes the normal flow of process gas through the filter and travels the length of the cartridge to dislodge the dust cake accumulated on the outside of the filter pleats. The dust cake falls from the filter pleats to the hopper shaped bottom of the dirty air plenum for removal by an auger or similar means. At this point, the momentary effect of the short blast of cleaning air has dissipated and the normal flow of process gas though the cartridge filter resumes.

One of the earliest developments in a unitary cartridge filter is taught in my U.S. Pat. No. 5,632,791 showing a pleated filter with a closed bottom and a molded top configured with a peripheral exterior groove to sealingly mate with the circular opening through the tube sheet of the baghouse. The molding material was preferably a urethane having a durometer of between 30 to 70 shore A. Also important was a dimensional limitation to satisfy the relationship of $0.22<H/D<0.85$ where D was the diameter of the tube sheet hole and H was the distance between the peripheral groove and the top of the pleat pack encased in the molding material. The foregoing two features, in combination, permitted sufficient resiliency for the upper portion of the top fitting to deform during installation or removal of the filter in the tube sheet and also to provide a reasonably effective seal between the peripheral groove and the tube sheet opening. The effectiveness of that seal could be further improved however by using a metal snap band positioned inside the mouth of the filter to push outwardly on the top fitting and to urge the peripheral groove to tighter engagement with the tube sheet. Such filters came to be known in the industry as "stepped-top" filters.

While the earliest unitary filter cartridges were formed as cylindrical constructions, eventually the need arose to adapt the features of unitary filter cartridges to non-round shapes in baghouses having oval or oblong openings. My patent U.S. Pat. No. 5,730,766 generally adapted the foregoing principles of stepped-top filter construction to a filter for an oblong opening. Due to the cross sectional length of the opening, here a snap band was mandatory in order to maintain an effective seal between the peripheral sealing groove of the top fitting and the tube sheet of the baghouse.

In U.S. Pat. No. 6,299,662, Poulsen used a metal expander in place of a snap band to achieve greater elastic compression of the upper collar of a stepped-top cylindrical filter cartridge for sealing against the tube sheet to accommodate variances in uniform circular hole size in the tube sheet openings. While achieving an improved seal, the expander naturally increased the expense associated with the filter cartridges and required a separate, specially manufactured part. Additional examples of a similar approach to the sealing problem are shown in U.S. Pat. No. 6,726,735 of Oussoren et al in which various configurations of the molded top were used in conjunction with an expander inserted into a stepped-top filter to try to achieve a more effective seal between the filter cartridge and the tube sheet opening. Obviously any leaks at all in this critical area impaired the filtering operation.

One approach to overcome sealing issues is to provide a separate seal to the filter cartridge itself. Both of my patents U.S. Pat. Nos. 6,858,052 and 7,186,284 provide examples of this approach. The sealing gasket is formed of a resilient elastomeric and is fitted into the tube sheet hole. The filter cartridge is then inserted through the central bore of the gasket to provide the necessary force to urge the gasket to engagement with the tube sheet. Now, instead of the top fitting portion of the filter cartridge being resiliently deformable, the top portion was required to be rigid in order to compress the sealing gasket. This was achieved by greatly reducing the H/D ratio such that the upper end of the pleat pack extended almost to the top flange of the cartridge to be positioned adjacent the tube sheet when the filter was installed. While providing the necessary rigidity to the filter, some drawbacks did exist with this solution. The interior thickness of the molding material had to be increased to sufficiently encase the pleat pack which, in turn, reduced the bore of the filter mouth. In addition, shrinking of the molding material caused extreme dimensional variations in the molded top which resulted in leakage problems.

On the positive side, as shown particularly in U.S. Pat. No. 7,186,284, an undercut surface to form a peripheral sealing groove was no longer necessary and the exterior side wall of the top fitting could thus be molded without undercut in a one piece mold to eliminate vertical parting lines in the finished product. With this development, however, a new problem arose. During the curing process, the molding material between successive pleats in the pleat pack would shrink slightly so that the outside surface of the top fitting had more of a scalloped configuration around the edges of the pleats than a smooth cylindrical surface. This represented potential leakage regions in situations where the filter cartridge, sealing gasket and hole size of the tube sheet were outside normal tolerances.

In the cleaning of baghouse filters, numerous structural and operational differences have been examined in an effort to improve efficiency. As these relate to the background of the present invention, many enhancements to the cleaning cycle have been proposed. Commonly accepted wisdom suggests that the use of a venturi in conjunction with pulse-jet technology wherein a short blast of high pressure air is delivered to the mouth of an individual filter cartridge improves cleaning efficiency. The intended effect of the venturi structure is to entrain aspirated or secondary air with the initial blast of high pressure cleaning air blast to overcome the normal flow of process gas through the filter and to travel the length of the cartridge to dislodge the dust cake accumulated on the outside of the filter pleats. Effective cleaning power is achieved by a combination of two physical characteristics—that is, fluid flow through the filter media and pressure drop across the filter media. A venturi is known to increase the fluid flow during the cleaning cycle which improves cleaning performance. However, it is also know that the venturi structure itself increases pressure drop across the filter during normal filtering operation and this is a deleterious effect to the overall baghouse operation since any subsequent cleaning cycle must overcome the overall pressure differential of the filter cartridge itself, the accumulated dust cake, the opposing process gas flow and the physical characteristics of the equipment involved such as the venturi itself.

Like U.S. Pat. Nos. 6,858,052 and 7,186,284, my patent U.S. Pat. No. 8,850,004 also required a separate sealing gasket for installing the filter cartridge in the tube sheet, but provided an aerodynamically contoured transition mouth to greatly improve cleaning performance. The transition mouth was formed with compound radii of curvatures and a bore which closely corresponded to the bore of the tubular core for improved cleaning power and increased pressure during a cleaning cycle and for reduced pressure drop during normal filtering operation.

Accordingly, in spite of the advancements made to date in the filtering arts, and particularly with reference to the advantages achieved by the filter of U.S. Pat. No. 8,850,004, a need remains for a highly efficient cartridge filter to minimize pressure drop for both filtering and cleaning cycles, to maximize cleaning power over a range of operating conditions, to improve cleaning air flow, and to eliminate the need for a separate sealing gasket. The primary objectives of this invention are to meet these diverse needs.

SUMMARY OF THE INVENTION

More specifically, an object of the invention is to provide a high efficiency cartridge filter which minimizes pressure drop for both filtering and cleaning cycles, which maximizes cleaning power over the normal range of baghouse operating conditions, and which eliminates the need for a separate sealing gasket to install in the tube sheet.

Another object of the invention is to provide a flow transition insert to retrofit a conventional stepped-top filter cartridge to yield an increase in total cleaning power by more than 25%. The benefits achieved by increasing the total cleaning power include lower filtering mode system resistance and less frequent pulse cleaning cycles required for a given operating period, so less compressed air is needed. These advantages therefore combine to result in lower energy consumption for baghouse operation.

Another object of the invention is to provide a flow transition insert to retrofit a conventional stepped-top filter cartridge to increase available cleaning pressure by more than 10% and to increase pulse-jet cleaning flow by 15% which yields total cleaning power increased by more than 25%. Such performance is achieved without the additional pressure drop experienced during normal filtering operation when venturi equipment has heretofore been necessary to boost cleaning flow.

An additional object of the invention is to provide a high efficiency cartridge filter of the character described with an aerodynamically contoured transition insert to minimize pressure drop during both filtering and cleaning cycles, and to seal the cartridge filter against the tube sheet.

A further object of the invention is to provide a high efficiency cartridge filter of the character described with an aerodynamically contoured transition insert comprising compound radii of curvatures for improved gas flow to the bore of the filter.

Yet another object of the invention is to provide a high efficiency cartridge filter of the character described wherein the bore of the transition insert closely matches the bore of the cartridge filter itself in order to minimize pressure drop during both the filtering and cleaning cycles.

Another object of the invention is to provide a high efficiency cartridge filter of the character described with an aerodynamically contoured transition insert adapted to supply both secondary and tertiary air to supplement the high pressure air delivered from the pulse-jet cleaning equipment.

A corollary object of the invention is to provide a high efficiency cartridge filter constructed in accordance with the foregoing features and easily adaptable either to round, circular tube sheet openings or to oblong tube sheet openings.

In summary, an object of the invention is to provide a high efficiency, stepped-top cartridge filter with a separate flow transition insert for installation in a generally uniform circular or oblong hole of a baghouse tube sheet. The cartridge includes a tubular core around which is fitted an elongate tube of pleated filter media to form a pleat pack. The pleat pack is sealed at the lower end thereof by a molded cap. A molded top fitting includes an upper flange, a side wall and a stepped portion leading to the bore of the filter. The flow transition insert is pressed into and locked against the top fitting to create a seal between the top fitting and the hole in the tube sheet. The flow transition insert includes an aerodynamically contoured mouth leading to a bore which closely corresponds to the bore of the tubular core and further defines an air passageway between the top fitting of the filter cartridge and the transition insert for supplying tertiary cleaning air to supplement the primary and secondary air flows during a cleaning cycle. The transition insert therefore provides for improved cleaning power, for increased pressure during a cleaning cycle, for reduced pressure drop during normal filtering operation, and for effective sealing of the filter to the tube sheet.

Other and further objects of the invention, together with the features of novelty appurtenant thereto, will appear in the course of the detailed description of the drawings.

BRIEF DESCRIPTION OF THE DRAWINGS

In the following description of the drawings, in which like reference numerals are employed to indicate like parts in the various views:

FIG. 1 is a sectional, side elevation view illustrating a conventional prior art baghouse configuration for cartridge filters;

FIG. 2 is a perspective view of a circular prior art filter cartridge with a stepped-top for use in an industrial baghouse;

FIG. 3 is an enlarged, side elevational view, partially sectional, of the prior art filter cartridge shown in FIG. 2 installed with a snap band to seal the molded top to the tube sheet of a baghouse;

FIG. 4 is an exploded side view, partially sectional, of the prior art filter shown in FIG. 3 to illustrate the molded filter top prior to installation of the snap band;

FIG. 5 is a top plan view of the prior art molded filter top shown in FIG. 4;

FIG. 6 is a top plan view of a flow transition insert constructed in accordance with a first embodiment of the invention for installation in a stepped-top filter as shown in FIGS. 3-5 to eliminate use of the snap band;

FIG. 7 is a side elevational, partially sectional, view of the flow transition insert of FIG. 6 wherein the left side of the view is shown in full lines and the right side of the view is shown in section to better illustrate the internal details of construction;

FIG. 8 is a bottom plan view of the flow transition insert illustrated in FIGS. 6-7;

FIG. 12 is a top plan view of a flow transition insert constructed in accordance with a second embodiment of the invention for installation in a stepped-top filter as shown in FIGS. 14-15;

FIG. 13 is a side elevational, partially sectional, view of the flow transition insert of FIG. 12 wherein the left side of the view is shown in full lines and the right side of the view is shown in section to better illustrate the internal details of construction;

FIG. 14 is a top plan view of a molded top of a stepped-top filter adapted to receive the flow transition insert of FIGS. 12-13;

FIG. 15 is a side elevational, partially sectional, view of the molded top of a stepped-top filter as shown in FIG. 14 wherein the left side of the view is shown in full lines and the right side of the view is shown in section to better illustrate the internal details of construction;

FIG. 18 is a side elevational view, partially sectional and partially schematic, of the flow transition insert of FIGS. 12-13 installed in a stepped-top filter of FIGS. 14-16 beneath a high pressure blow pipe to schematically illustrate the flow of primary, secondary and tertiary air flows during a cleaning cycle;

FIG. 23 is an enlarged, exploded, partially sectional, side view of the flow transition insert of FIGS. 19-20 positioned for installation in the molded top of a stepped-top filter as shown in FIGS. 21-22 wherein the left side of the view is shown in full lines and the right side of the view is shown in section to better illustrate the internal details of construction;

FIG. 25 is a top plan view of an oblong filter cartridge constructed in accordance with a fourth embodiment of the invention;

FIG. 26 is a side elevational, partially sectional, view of the molded top of the oblong filter cartridge shown in FIG. 25 wherein the left side of the view is shown in full lines and the right side of the view is shown in section to better illustrate the internal details of construction;

FIG. 27 is a side sectional view taken through the width of the molded top of the oblong filter cartridge shown in FIGS. 25-26;

FIG. 28 is a top plan view of a flow transition insert adapted for the oblong filter cartridge of FIGS. 25-27;

FIG. 29 is a side elevational, partially sectional, view of the flow transition insert shown in FIG. 28 wherein the left side of the view is shown in full lines and the right side of the view is shown in section to better illustrate the internal details of construction;

FIG. 30 is a side sectional view taken through the width of the flow transition insert shown in FIGS. 28-29;

FIG. 31 is an exploded, partially sectional, side view along the length of the flow transition insert of FIGS. 28-30 positioned for installation in the molded top of the oblong filter cartridge as shown in FIGS. 25-27 wherein the left side of the view is shown in full lines and the right side of the view is shown in section to better illustrate the internal details of construction;

FIG. 32 is an exploded, sectional side view through the width of the flow transition insert of FIGS. 28-30 positioned for installation in the molded top of the oblong filter cartridge as shown in FIGS. 25-27.

DETAILED DESCRIPTION OF THE DRAWINGS

Figure 9:
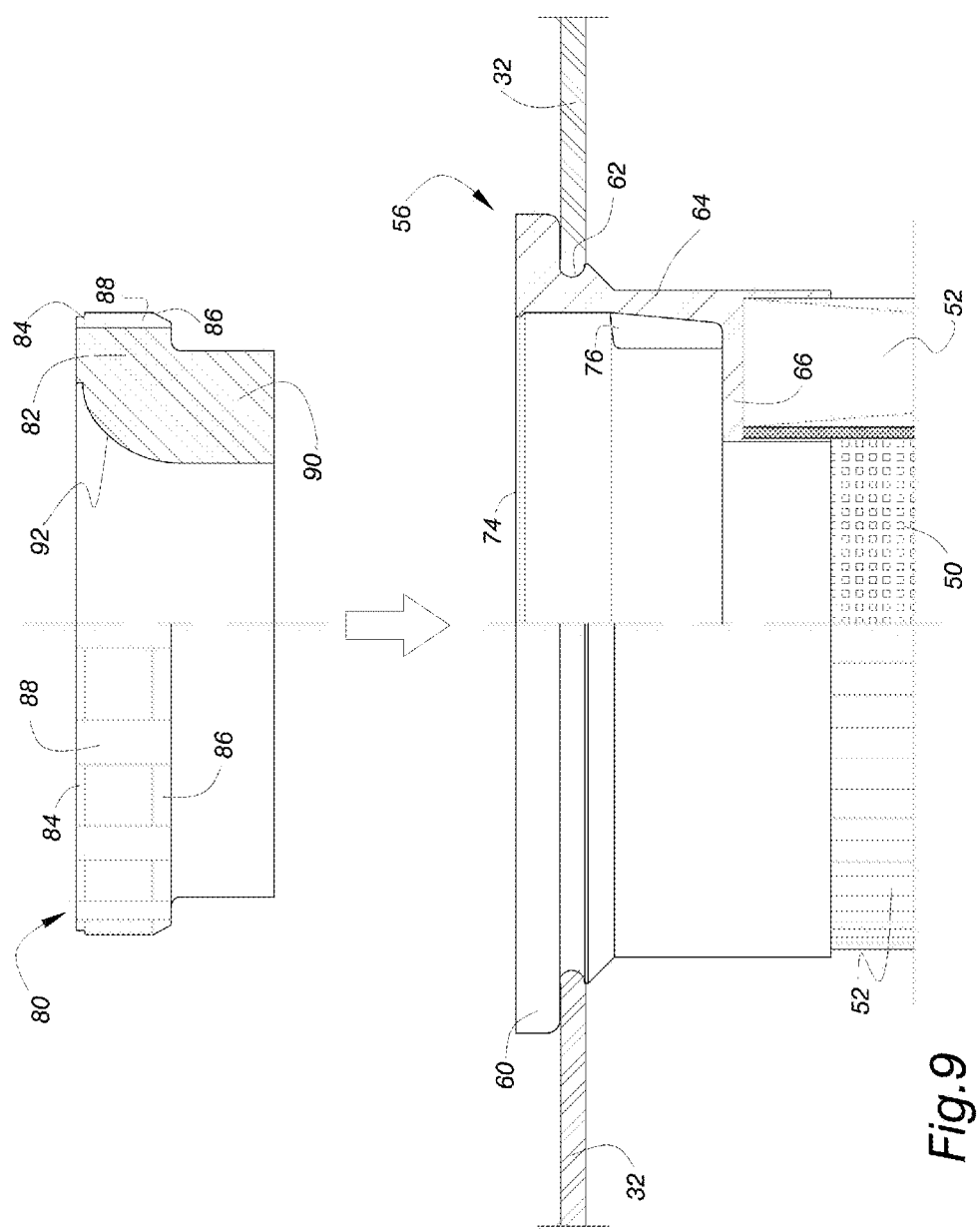
FIG. 9 is an exploded, partially sectional, side view of the flow transition insert of FIGS. 6-8 positioned for installation in the molded top of a stepped-top filter as shown in FIGS. 3-5 wherein the left side of the view is shown in full lines and the right side of the view is shown in section to better illustrate the internal details of construction.

Referring to the drawings in greater detail, attention is first focused on the prior art illustrations shown in FIGS. 1 through 5. FIG. 1 illustrates, somewhat schematically, the major components of a pulse-jet baghouse. A large sheet metal housing 30 is divided by a horizontally support tube sheet 32 into a dirty air plenum 34 and a clean air plenum 36. Vertically suspended through uniform openings in the tube sheet 32 is a plurality of pleated filter cartridges 38. Inlet ductwork 40 delivers particulate laden gas to the dirty air plenum 34. As the gas passes through the filter cartridges 38 and into the clean air plenum 36, dust accumulates on the exterior surface of the filters 38. The scrubbed process gas is discharged from the clean air plenum 36 through an exhaust duct 42 to the atmosphere or to additional processing such as heat recovery equipment (not shown).

Positioned in the clean air plenum above the rows of filters 38 are high pressure blow pipes 44 with orifices registering above the mouths of the filters 38. As dust builds up, the filter cartridges 38 must be periodically cleaned. This is accomplished by delivering a short blast of high pressure air to one or more rows of the filters 38. The high pressure air blast enters the mouth of the filter 38 and travels the length of the pleated media to dislodge any accumulated dust cake from the exterior surface of the filters 38. That dislodged dust falls by gravity into the hopper shaped section 46 of the baghouse 30 where it may be subsequently removed by an auger or similar equipment (not shown). Those filters 38 or rows of filters 38 not being subjected to the high pressure cleaning air cycle remain in normal filtering service.

A typical prior art, cylindrical stepped-top filter cartridge 38 is illustrated in FIGS. 2-5 for application in uniform circular holes of a baghouse tube sheet 32. The cartridge 38 includes a central cylindrical core 50 formed by foraminous plastic. Circumscribing the central core 50 is a cylindrical ring of pleated filter media 52. The combination of the pleated filter media 52 supported on the core 50 is commonly referred to as the pleat pack. A molded bottom end cap 54 sealingly closes the lower ends of both the core 50 and filter media 52 of the pleat pack. The end cap 54 may be a circular disk as shown or a so-called "star bottom" which conforms to the shape of the pleated filter media 52.

The upper end of the pleat pack is terminated with an open mouthed, molded top fitting 56, the details of which as best seen in FIGS. 3-5. Intermediate the top fitting 56 and the bottom end cap 54 are retaining bands 58, shown in FIG. 2, spaced apart along the length of the filter cartridge 38. The retaining bands 58 serve to limit flexure of the pleated filter media 52 during a cleaning cycle.

The top fitting 56 has an upper annular flange 60 with an outer diameter greater than the hole diameter D in the tube sheet 32. The inside diameter of the flange 60 is less than the hole diameter D in the tube sheet 32 and forms the opening of the mouth into the filter cartridge 38. Immediately beneath the flange 60 is a groove 62 formed in the side wall 64 of the top fitting 56. The groove 62 is sized to substantially conform to the shape and diameter of the hole diameter D in the tube sheet 32 in order to seal therewith when the filter cartridge 38 is installed as shown. The side wall 64 extends downwardly to integrally join a stepped portion 66 which overlies the pleat pack. A mold ridge or series of bosses (not shown) in the stepped portion results from the portion of the central mold part that supports the pleat pack during the molding process. From the stepped portion 66, inner and outer skirts 70 & 72 extend downwardly to form the inner and outer surfaces of the portion of the molding material that bonds to the core 50 and pleated filter media 52. In other words, outer skirt 72 forms the lower outside diameter of the top fitting and is slightly smaller in size than the diameter D of the tube sheet hole. The inner skirt 70 forms the circular bore of the top fitting 56 and substantially corresponds to the inside diameter of the core 50.

Around the interior opening of the flange 60 is an inwardly projecting ridge 74. Molded into the side wall 64 and radially space are a plurality of pedestals 76 which extend in length from the stepped portion 66 upwardly to terminate beneath the region of the side wall 64 that contacts the tube sheet 32. Three such pedestals 76 are illustrated in FIG. 5 radially spaced at 120 degrees. Between the ridge 74 and resting on the upper ends of the pedestals 76 is a spring steel snap band 78 which seals the molded top fitting 56 to the tube sheet 32.

So that the filter cartridge 38 can be easily installed in and removed from the tube sheet 32, the material of construction of the top fitting 56 and length of the side wall 64 are of critical importance. The molding material is preferably a urethane having a durometer of between 30 to 70 shore A. The side wall 64 is extended downwardly a sufficient length to satisfy the relationship of $0.22<H/D<0.85$ where D was the diameter of the tube sheet hole and H was the distance between the ridge 74 and the stepped portion 66. These features, in combination, permit sufficient resiliency in the upper portion of the top fitting 56 to deform during installation or removal of the filter 38 in the tube sheet 32 when the snap band 78 is removed and also to provide a reasonably effective seal between the peripheral groove 62 and the hole through the tube sheet 32 when the snap band 78 is inserted between the ridge 74 and the upper ends of the pedestals 76.

Disclosed is FIGS. 6-8 is a flow transition insert 80 specifically adapted to retrofit existing stepped-top filter cartridges of the character shown in FIGS. 2-5 to provide a high efficiency filtration and cleaning while eliminating the need for a snap band 78.

The flow transition insert 80 is preferably molded of a urethane having a durometer of between 30 to 70 shore A, but may be somewhat more rigid than the material forming the top fitting 56 of the filter cartridge 38. The insert 80 has an upper disk section 82 having a height substantially matching the snap band 78. That is to say, the height of the disk section 82 is substantially the same as the distance from the pedestals 76 to the top of the flange 60 of the filter cartridge 38. In diameter, the disk section 82 is the same as or slightly larger than the diameter of the top fitting 56 of the filter 38 where the snap band 78 would normally be positioned. The uppermost perimeter edge of the disk section 82 includes a notch 84 sized to mate with the ridge 74 of the top fitting 56. The lowermost perimeter edge of the disk section is a chamfered edge 86. Around the diameter of the disk section 82 is a plurality of uniformly spaced relief grooves 88.

Integrally molded with the disk section 82 is a lower annular section 90 which in height is less than the height of the pedestals 76 of the top fitting 56 of the filter 38. The outermost diameter of the annular section 90 is less than the interior diameter of the side wall 64 of the top fitting 56 of the filter 38 and the innermost diameter of the annular section 90 substantially matches the inner diameter of the cylindrical core 50 (i.e., the longitudinal bore of the filter 38).

Figure 19:
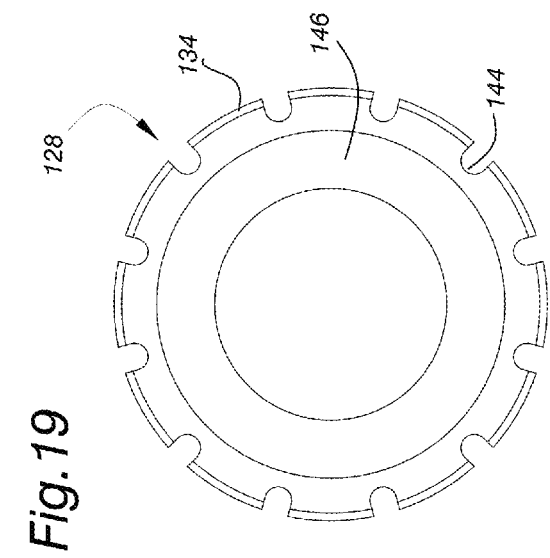
FIG. 19 is a top plan view of a flow transition insert constructed in accordance with a third embodiment of the invention for installation in a stepped-top filter as shown in FIGS. 21-22.
Figure 20:
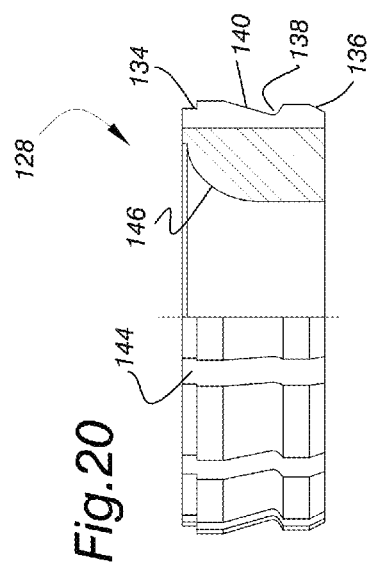
FIG. 20 is a side elevational, partially sectional, view of the flow transition insert of FIG. 19 wherein the left side of the view is shown in full lines and the right side of the view is shown in section to better illustrate the internal details of construction.

Interiorly of the mouth of the flow transition insert 80 is molded a rounded shoulder 92 which extends smoothly continuous from substantially the uppermost part of the disk section downwardly to the innermost diameter of the annular section 90. Most preferably, the rounded shoulder 92 will be formed as compound radii of curvatures as taught in my patent U.S. Pat. No. 8,850,004 and illustrated in FIG. 19 thereof which is incorporated by reference herein. However, any smoothly rounded shoulder for the transition mouth will prove beneficial in filtration and cleaning functions due to the newly disclosed features for a filter cartridge as disclosed herein.

FIG. 9 illustrates an exploded view of the insert 80 positioned above the top fitting 56 of the filter 38 prior to installation. Here it should be noted that since an H/D ratio satisfies the relationship of $0.22<H/D<0.85$ there is sufficient resiliency in the upper portion of the top fitting 56 to deform during installation so as to receive the hole in the tube sheet 32 within the groove 62 of the top fitting 56.

Figure 10:
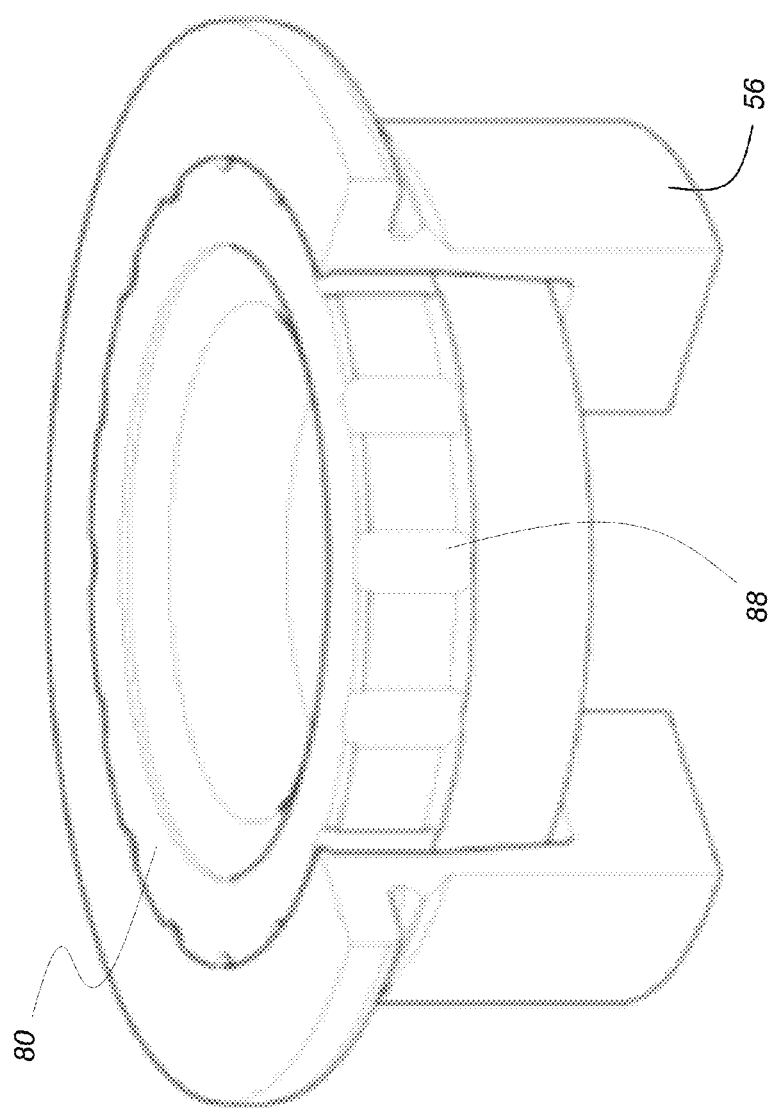
FIG. 10 is a perspective view of the flow transition insert fitted into the molded top of the stepped-top filter with a portion of the molded top broken away to better illustrate the internal details of construction.
Figure 11:
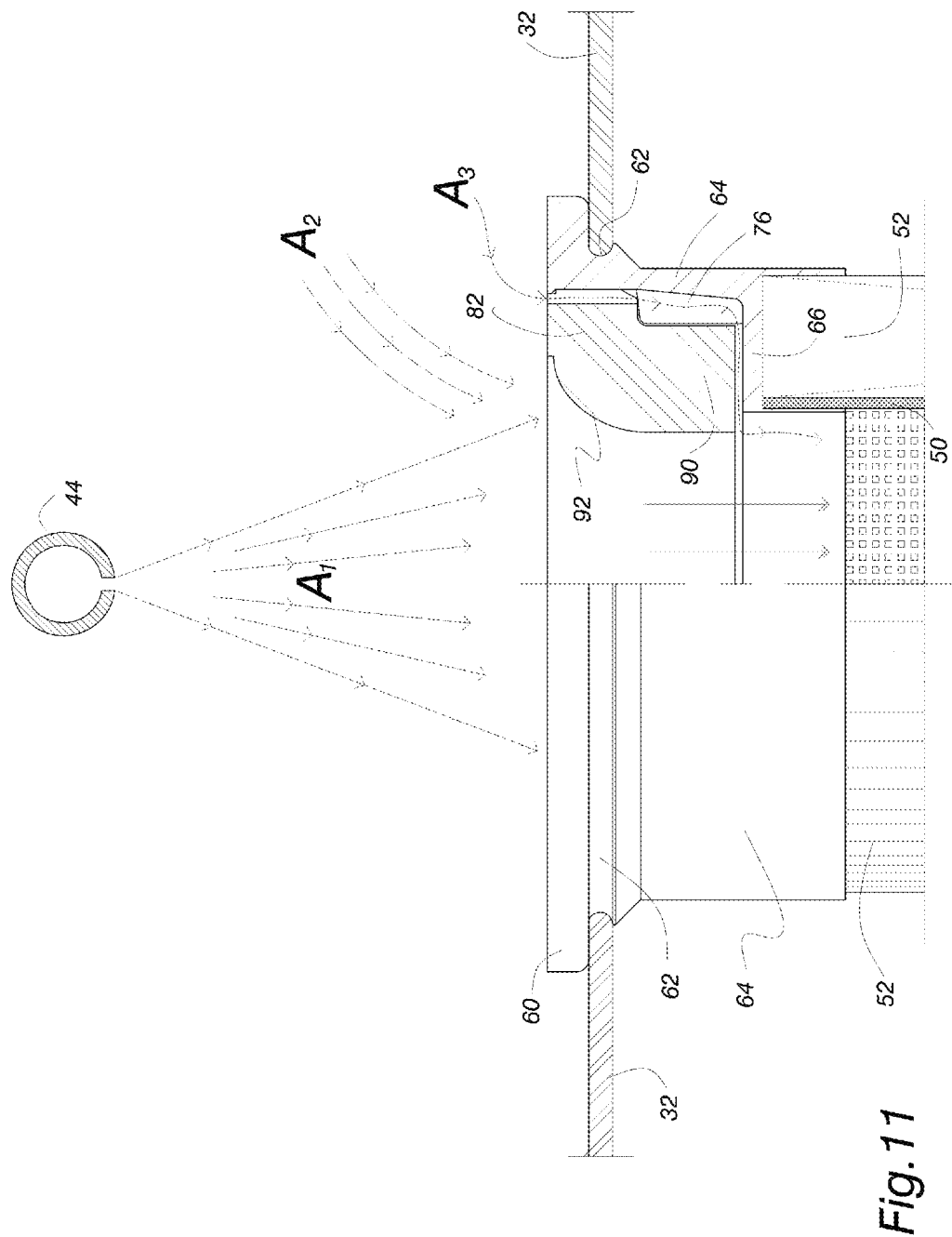
FIG. 11 is a side elevational view, partially sectional and partially schematic, of the flow transition insert installed in a stepped-top filter beneath a high pressure blow pipe to schematically illustrate the flow of primary, secondary and tertiary air flows during a cleaning cycle.

FIGS. 10 & 11 illustrate the insert 80 installed within the top fitting 56. With particular reference to FIG. 11, it will be understood that the insert 80 is supported within the top fitting 56 by the lowermost surface of the annular section 90 resting on the upper surfaces of the pedestals 76. The notch 84 receives the interior ridge 74 of the top fitting 56 to lock the insert in place within the top fitting 56. The outer diameter of the disk section 82 urges the upper part of the side wall 64 outwardly to seal the groove 62 of the top fitting 56 with the inner diameter of the hole in the tube sheet 32. Since the outermost diameter of the annular section 90 is less than the inner diameter of the side wall 64 and the height of the annular section 90 is less than the height of the support pedestals 76, an air passageway is established between the insert 80 and the interior surfaces of the top fitting 56. More specifically, air can flow through the relief grooves 88, between the outermost diameter of the annual section 90 and the innermost diameter of the side wall 64, and between the stepped portion 66 of the top fitting and the lowermost surface of the annual section 90.

In operation, as constructed and assembled as heretofore disclosed, a cleaning cycle will periodically occur to dislodge accumulated dust cake from the exterior surface of the filter media 52. FIG. 11 schematically illustrates the flow of cleaning air. A high pressure blast of cleaning air is delivered as a cone of primary air $A_1$ from the blow pipe 44 directed to the mouth of the insert 80. The primary air $A_1$ induces secondary air $A_2$ adjacent the cone of primary air $A_1$ to also enter the mouth of the insert 80 and flow downwardly. The combined flow of primary air $A_1$ and secondary air $A_2$ flowing through the throat of the insert 80 further induces tertiary air $A_3$ to flow through the air passageway previously described to combine with the primary air $A_1$ and secondary air $A_2$ in order to aid the overall cleaning of the filter 38. Accordingly, tertiary air $A_3$ supplies between 5% and 20% additional cleaning air for significantly improved cleaning function of a filter cartridge 38 retrofitted with the flow transition insert 80 of this invention while, at the same time, significantly improving filtration efficiency and eliminating the need of a separate snap band 78 for sealing the top fitting 56 of the filter 38 to the tube sheet 32.

Attention is next directed to the second embodiment of the invention illustrated in FIGS. 12-18 which has much the same functionality as the first embodiment in terms of providing improved filtration and cleaning efficiency, elimination of the snap band while still sealing the top fitting of the filter cartridge to the tube sheet, and providing tertiary cleaning air. However, as will be seen, the second embodiment has some structural differences and provides for a positive mechanical lock between the insert and the top fitting of the filter.

The flow transition insert 94 is preferably molded of a urethane having a durometer of between 30 to 70 shore A, but may be somewhat more rigid than the material forming the top fitting 96 of the filter cartridge 98. The insert 94 has an upper disk section 100 with an outermost diameter sufficient to overlie a portion of the annular flange 102 of the filter cartridge 98.

Integrally molded with the disk section 100 is a lower annular section 104 which in height extends from the disk section 100 to the top of a plurality of support bosses 106 molded into the stepped portion 108 of the top fitting 96. A plurality of radially spaced vertical relief grooves 110 are cut into the outermost diameters of both the disk section 100 and the annular section 104.

The outermost diameter of the annular section 104 substantially matches or is slightly larger than the inside diameter of the side wall 112 of the top fitting 96. The lowermost portion of the outer diameter of the annular section 104 has a chamfered edge 114 to assist in positioning the insert 94 into the top fitting 96. Cut into the outermost diameter of the annular section 104 is a circumferential groove 116 which mates with a ridge 118 molded into the side wall 112 of the top fitting 96 at a location just beneath the tube sheet 32 when installed therein. The innermost diameter of the annular section 104 substantially matches the inner diameter of the cylindrical core 50 (i.e., the longitudinal bore of the filter 98).

Interiorly of the mouth of the flow transition insert 94 is molded a rounded shoulder 120 which extends smoothly continuous from substantially the uppermost part of the disk section 100 downwardly to the innermost diameter of the annular section 104. Most preferably, the rounded shoulder 120 will be formed as compound radii of curvatures as taught in my patent U.S. Pat. No. 8,850,004 and illustrated in FIG. 19 thereof. However, any smoothly rounded shoulder for the transition mouth will prove beneficial in filtration and cleaning functions due to the newly disclosed features for a filter cartridge as disclosed herein.

The top fitting 96 further includes an annular recess 122 in the flange 102 in which is seated the lower surface of the disk section 100. A groove 124 is present in the stepped portion 108 as a result of a ring which supports the pleat pack during the molding process.

Those skilled in the art of filter cartridges will readily understand that the filter cartridge 98 illustrated in FIGS. 12-18 includes a cylindrical core 50 around which is positioned the pleated filter media 52 to form the pleat pack that is closed at the lower end thereof by a bottom end cap (not shown) or "star bottom" as previously described for prior art filters.

Figure 16:
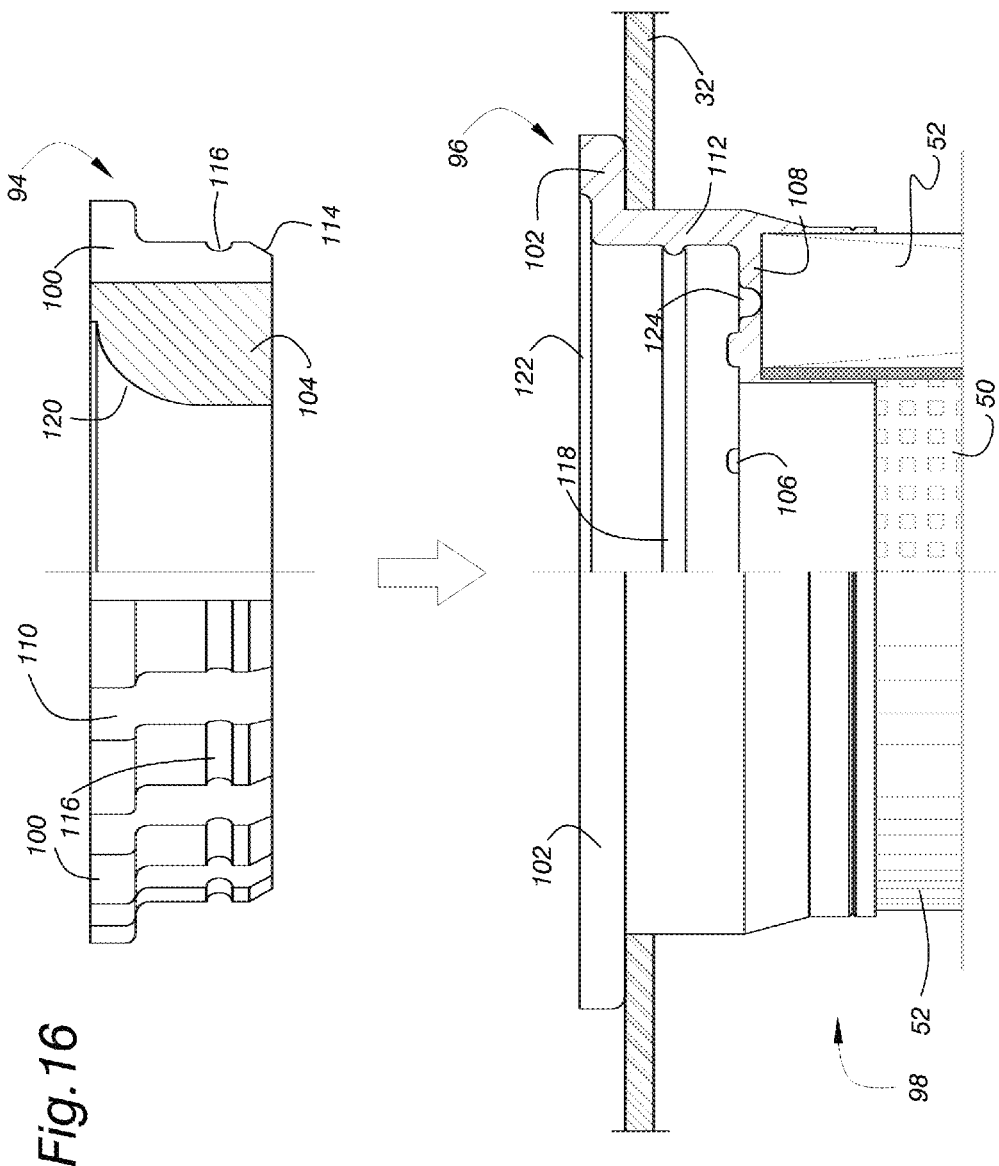
FIG. 16 is an enlarged, exploded, partially sectional, side view of the flow transition insert of FIGS. 12-13 positioned for installation in the molded top of a stepped-top filter as shown in FIGS. 14-15 wherein the left side of the view is shown in full lines and the right side of the view is shown in section to better illustrate the internal details of construction.

FIG. 16 illustrates an exploded view of the insert 94 positioned above the top fitting 96 of the filter 98 prior to installation. Here it should be noted that since an H/D ratio satisfies the relationship of 0.22<H/D<0.85 there is sufficient resiliency in the upper portion of the top fitting 96 to deform slightly during installation so that the top fitting 96 may be pushed into the hole in the tube sheet 32.

Figure 17:
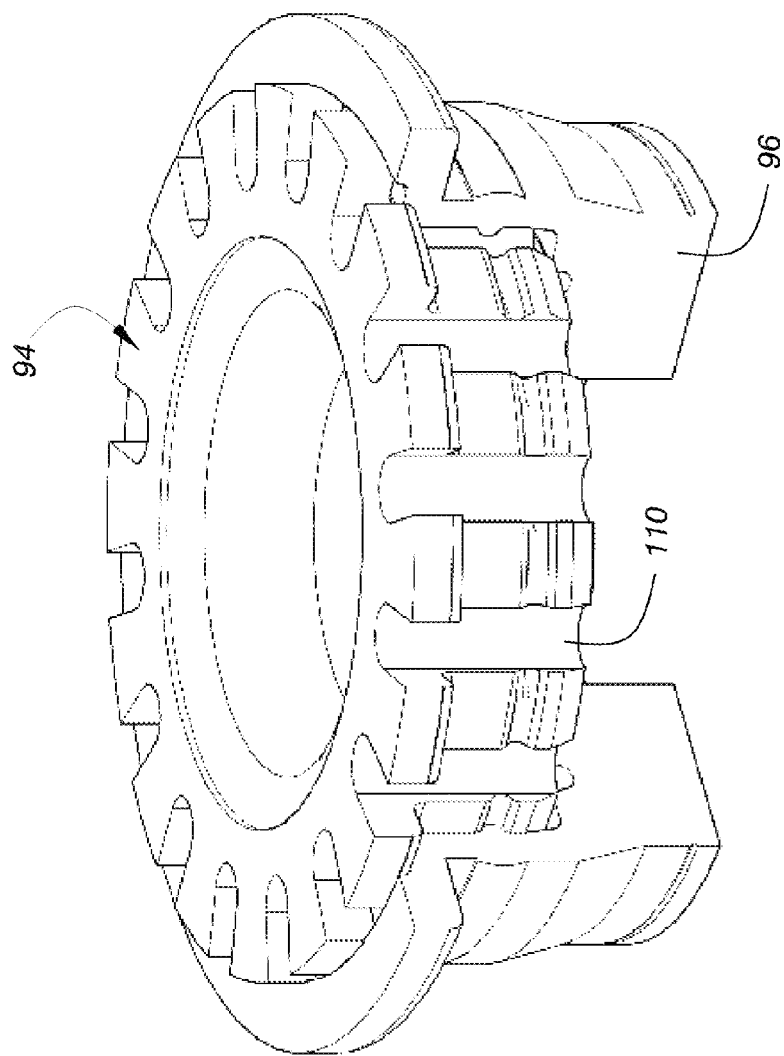
FIG. 17 is a perspective view of the flow transition insert fitted into the molded top of the stepped-top filter of FIGS. 14-16 with a portion of the molded top broken away to better illustrate the internal details of construction.
Figure 21:
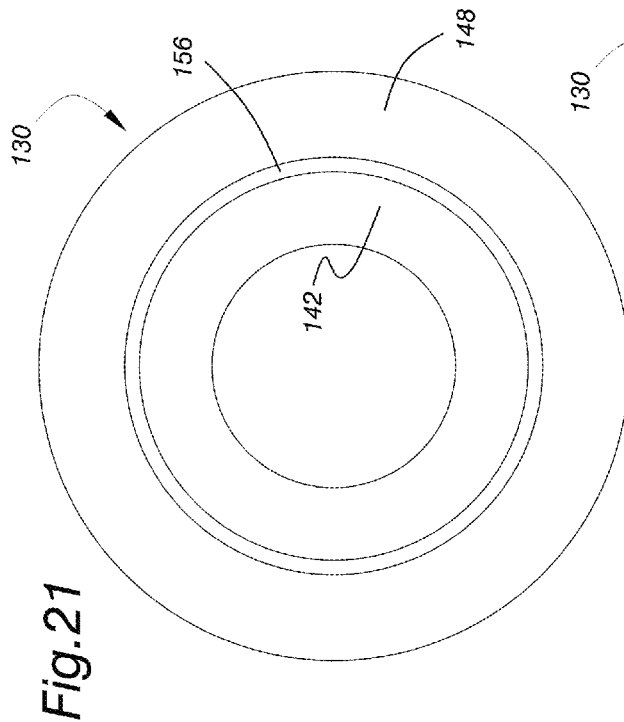
FIG. 21 is a top plan view of a molded top of a stepped-top filter adapted to receive the flow transition insert of FIGS. 19-20.
Figure 22:
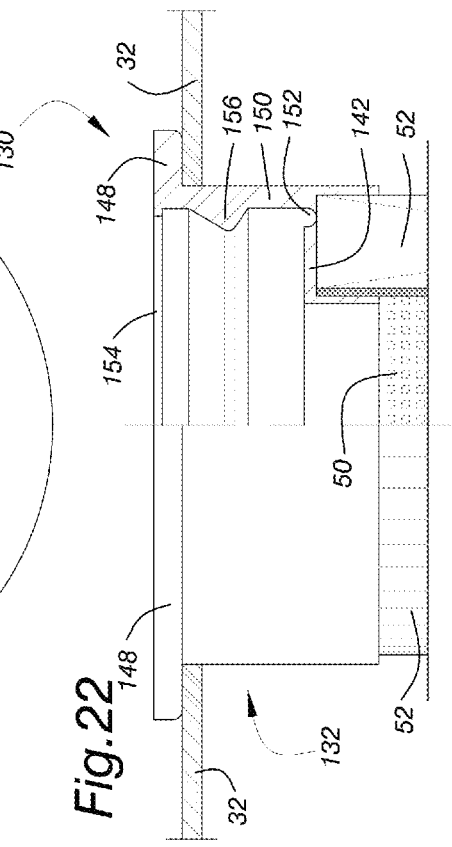
FIG. 22 is a side elevational, partially sectional, view of the molded top of a stepped-top filter as shown in FIG. 21 wherein the left side of the view is shown in full lines and the right side of the view is shown in section to better illustrate the internal details of construction.

FIGS. 17 & 18 illustrate the insert 94 installed within the top fitting 96. With particular reference to FIG. 18, it will be understood that the insert 94 is supported within the top fitting 96 by the lowermost surface of the annular section 104 resting on the upper surfaces of the support bosses 106. The circumferential groove 116 receives the interior ridge 118 of the top fitting 96 to lock the insert 94 in place within the top fitting 96 and, due to the resiliency of the material, causes the ridge 118 to push outwardly creating a bulge 126 beneath the tube sheet 32 to seal the top fitting 96 against the inner diameter of the hole in the tube sheet 32. Since the lowermost surface of the annular section 90 is spaced above the stepped portion 108 of the top fitting 96 and the vertical relief grooves 110 extend inwardly from the inside diameter of the side wall 112, an air passageway is established between the insert 94 and the interior surfaces of the top fitting 96. More specifically, air can flow through the relief grooves 110, and between the stepped portion 108 of the top fitting 96 and the lowermost surface of the annual section 104.

In operation, as constructed and assembled as heretofore disclosed, a cleaning cycle will periodically occur to dislodge accumulated dust cake from the exterior surface of the filter media 52. FIG. 18 schematically illustrates the flow of cleaning air. A high pressure blast of cleaning air is delivered as a cone of primary air $A_1$ from the blow pipe 44 directed to the mouth of the insert 94. The primary air $A_1$ induces secondary air $A_2$ adjacent the cone of primary air $A_1$ to also enter the mouth of the insert 94 and flow downwardly. The combined flow of primary air $A_1$ and secondary air $A_2$ flowing through the throat of the insert 94 further induces tertiary air $A_3$ to flow through the air passageway previously described to combine with the primary air $A_1$ and secondary air $A_2$ in order to aid the overall cleaning of the filter 38. Accordingly, tertiary air $A_3$ supplies between 5% and 20% additional cleaning air for significantly improved cleaning function of the filter cartridge 98 while, at the same time, significantly improving filtration efficiency and eliminating the need of a separate snap band for sealing the top fitting 96 of the filter 98 to the tube sheet 32.

Attention is next directed to the third embodiment of the invention illustrated in FIGS. 19-24 which has much the same functionality as the previous embodiments in terms of providing improved filtration and cleaning efficiency, elimination of the snap band while still sealing the top fitting of the filter cartridge to the tube sheet, and providing tertiary cleaning air. However, as will be seen, the third embodiment has some structural differences and provides for a positive mechanical lock and cam surface between the insert and the top fitting of the filter.

The flow transition insert 128 is preferably molded of a urethane having a durometer of between 30 to 70 shore A, but may be somewhat more rigid than the material forming the top fitting 130 of the filter cartridge 132. The insert 128 has a disk-like or puck shape to substantially fit within the top fitting 130.

The uppermost peripheral edge of the insert 128 includes a notch 134. The lowermost peripheral edge of the insert 128 has a chamfered edge 136 to assist in positioning the insert 128 into the top fitting 130. Between the notch 134 and chamfered edge 136 is a circumferential groove 138 beneath a tapered cam surface 140.

The overall height of the insert 128 is less than the distance from the upper surface of the top fitting 130 and the stepped portion 142 thereof. A plurality of radially spaced vertical relief grooves 144 are cut into the outermost side surface of the insert 128 and extend through the entire height of the insert.

Interiorly of the mouth of the flow transition insert 128 is molded a rounded shoulder 146 which extends smoothly continuous from substantially the uppermost part of the insert 128 downwardly to the innermost diameter of the insert 128 which substantially matches the inner diameter of the cylindrical core 50 (i.e., the longitudinal bore of the filter 132). Most preferably, the rounded shoulder 146 will be formed as compound radii of curvatures as taught in my patent U.S. Pat. No. 8,850,004 and illustrated in FIG. 19 thereof. However, any smoothly rounded shoulder for the transition mouth will prove beneficial in filtration and cleaning functions due to the newly disclosed features for a filter cartridge as disclosed herein.

The top fitting 130 has an upper annular flange 148 with an outer diameter greater than the hole diameter in the tube sheet 32. The side wall 150 extends downwardly to integrally join the stepped portion 142 which overlies the pleat pack formed by the cylindrical core 50 and pleated filter media 52. A groove 152 is present in the stepped portion 142 as a result of a ring which supports the pleat pack during the molding process.

At the upper interior edge of the flange 148 is a locking ridge 154 adapted to mate with the notch 134 formed in the insert 128. Between the upper flange 148 and the stepped portion 142 is an inwardly projecting, molded bulbous ridge 156.

Those skilled in the art of filter cartridges will readily understand that the filter cartridge 132 illustrated in FIGS. 12-18 includes a cylindrical core 50 around which is positioned the pleated filter media 52 to form the pleat pack that is closed at the lower end thereof by a bottom end cap (not shown) or "star bottom" as previously described for prior art filters.

FIG. 23 illustrates an exploded view of the insert 128 positioned above the top fitting 130 of the filter 132 prior to installation. Here it should be noted that since an H/D ratio satisfies the relationship of 0.22<H/D<0.85 there is sufficient resiliency in the upper portion of the top fitting 130 to deform slightly during installation so that the top fitting 130 may be pushed into the hole in the tube sheet 32.

Figure 24:
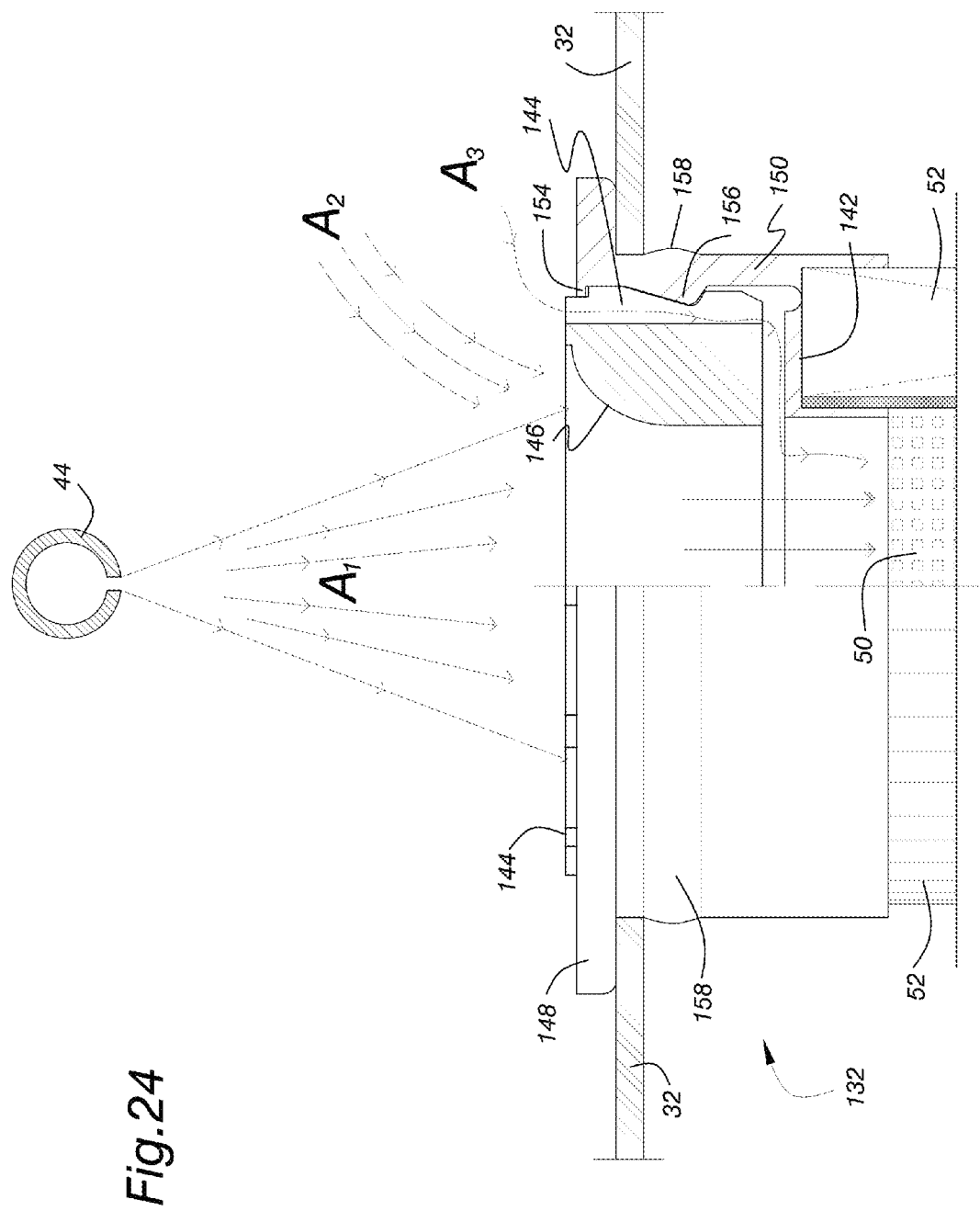
FIG. 24 is a side elevational view, partially sectional and partially schematic, of the flow transition insert of FIGS. 19-20 installed in a stepped-top filter of FIGS. 21-23 beneath a high pressure blow pipe to schematically illustrate the flow of primary, secondary and tertiary air flows during a cleaning cycle.

FIG. 24 illustrates the insert 128 installed within the top fitting 130. As the insert 128 is pushed into the top fitting 130, the cam surface 140 of the insert 132 engages the bulbous ridge 156 and, due to the resiliency of the material, causes the ridge 156 to push outwardly creating a bulge 158 beneath the tube sheet 32 to seal the top fitting 130 against the inner diameter of the hole in the tube sheet 32. With the ridge 156 received in the groove 138 of the insert 128, and the notch 134 positioned beneath the locking ridge 154, the insert 128 is locked to engagement with the top fitting 130. As installed, therefore, a gap exists between the lower surface of the insert 128 and the stepped portion 142 of the top fitting 130 to establish an air passageway. More specifically, air can flow through the relief grooves 144, and between the stepped portion 142 of the top fitting 130 and the lowermost surface of the insert 128.

In operation, as constructed and assembled as heretofore disclosed, a cleaning cycle will periodically occur to dislodge accumulated dust cake from the exterior surface of the filter media 52. FIG. 24 schematically illustrates the flow of cleaning air. A high pressure blast of cleaning air is delivered as a cone of primary air $A_1$ from the blow pipe 44 directed to the mouth of the insert 128. The primary air $A_1$ induces secondary air $A_2$ adjacent the cone of primary air $A_1$ to also enter the mouth of the insert 94 and flow downwardly. The combined flow of primary air $A_1$ and secondary air $A_2$ flowing through the throat of the insert 128 further induces tertiary air $A_3$ to flow through the air passageway previously described to combine with the primary air $A_1$ and secondary air $A_2$ in order to aid the overall cleaning of the filter 132. Accordingly, tertiary air $A_3$ supplies between 5% and 20% additional cleaning air for significantly improved cleaning function of the filter cartridge 132 while, at the same time, significantly improving filtration efficiency and eliminating the need of a separate snap band for sealing the top fitting 130 of the filter 132 to the tube sheet 32.

Attention is lastly directed to the fourth embodiment of the invention illustrated in FIGS. 25-33 which adapts the features of the present invention to an oblong filter cartridge. As used in this application, the term oblong describes an elongate shape with semicircular ends, each end having the same diameter, and spaced apart parallel sides emanating from the semicircular ends, which is also known as a "race track" shape, and wherein the aspect ratio of the length of the shape over the width of the shape is greater than one and less than six. In determining an H/D ratio for a filter top of the "race track" shape, the width dimension is substituted for the variable D. As used in this application, the term oblong is also intended to describe an oval or elliptical shape wherein the aspect ratio of the length of the major axis over the length of the minor axis is greater than one and less than six. In determining an H/D ratio for a filter top of the oval shape, the length dimension of the major axis is substituted for the variable D.

An oblong, stepped-top filter cartridge 160 is illustrated in FIGS. 25-27 for application in uniform oblong holes of a baghouse tube sheet 162. The cartridge 160 includes a central oblong core 164 formed by foraminous plastic. Circumscribing the central core 164 is an oblong tube of pleated filter media 166 to form a pleat pack. A molded bottom end cap or "star bottom" (not shown) sealingly closes the lower ends of both the core 164 and filter media 166 of the pleat pack as is well known in this art.

The upper end of the pleat pack is terminated with an open mouthed, molded top fitting 168. The top fitting 168 has an oblong upper annular flange 170 which is sized to overlie the oblong hole in the tube sheet 162 in which the filter cartridge 160 is to be installed. Immediately beneath the flange 170 is a groove 172 formed in the side wall 174 of the top fitting 168. The groove 172 is sized to substantially conform to the shape of the hole in the tube sheet 162 in order to seal therewith when the filter cartridge 160 is installed as shown. The side wall 174 extends downwardly to integrally join a stepped portion 176 which overlies the pleat pack. A mold ridge 178 in the stepped portion 176 results from the portion of the central mold part that supports the pleat pack during the molding process.

Around the interior opening of the flange 170 is an inwardly projecting ridge 180. Around the interior of the side wall 174 are a plurality of pedestals 182 which extend in height from the stepped portion 176 upwardly to terminate beneath the region of the side wall 174 that contacts the tube sheet 162.

So that the filter cartridge 160 can be easily installed in and removed from the tube sheet 162, the material of construction of the top fitting 168 and length of the side wall 174 are of critical importance. The molding material is preferably EPDM or a similar elastomer. The side wall 174 is extended downwardly a sufficient length to satisfy the relationship of $0.22<H/D<0.85$ where D was the substituted dimension previously described for an oblong shape and H is the distance between the ridge 180 and the stepped portion 176. These features, in combination, permit sufficient resiliency in the upper portion of the top fitting 168 to deform during installation or removal of the filter 160 in the tube sheet 162 when the flow transition insert 184 now to be described is removed from the top fitting 168.

Illustrated in FIGS. 28-30 is a flow transition insert 184 specifically adapted to the oblong stepped-top filter cartridge 160 shown in FIGS. 25-27 to provide a high efficiency filtration and cleaning filter while eliminating the need for a snap band.

The flow transition insert 184 is preferably molded of a urethane having a durometer of between 30 to 70 shore A, but may be somewhat more rigid than the material forming the top fitting 168 of the filter cartridge 160. The insert 184 has an upper disk section 186 having a height substantially matching the distance from the top of the pedestals 182 to the top of the flange 170 of the filter cartridge 160. In dimensions, the disk section 186 is the same as or slightly larger than the interior dimensions of the top fitting 170. The uppermost perimeter edge of the disk section 186 includes a notch 188 sized to mate with the ridge 180 of the top fitting 168. The lowermost perimeter edge of the disk section is a chamfered edge 190. Around the outer surface of the disk section 186 is a plurality of uniformly spaced relief grooves 192.

Integrally molded with the disk section 186 is a lower annular section 194 which in height is less than the height of the pedestals 182 of the top fitting 168. The outermost dimensions of the annular section 194 are less than the respective dimensions of the side wall 174 of the top fitting 168 and the innermost dimensions of the annular section 194 substantially match the respective inner dimensions of the oblong core 164 (i.e., the longitudinal bore of the filter 160).

Interiorly of the mouth of the flow transition insert 184 is molded a rounded shoulder 196 which extends smoothly continuous from substantially the uppermost part of the disk section 186 downwardly to the innermost dimensions of the annular section 194. Most preferably, the rounded shoulder 196 will be formed as compound radii of curvatures as taught in my patent U.S. Pat. No. 8,850,004 and illustrated in FIG. 19 thereof. However, any smoothly rounded shoulder for the transition mouth will prove beneficial in filtration and cleaning functions due to the newly disclosed features for a filter cartridge as disclosed herein.

FIGS. 31 & 32 illustrate exploded views of the insert 184 positioned above the top fitting 168 of the filter 160 prior to installation. Here it should be noted that since an H/D ratio satisfies the relationship of 0.22<H/D<0.85 there is sufficient resiliency in the upper portion of the top fitting 168 to deform during installation so as to receive the hole in the tube sheet 162 within the groove 172 of the top fitting 168.

Figure 33:
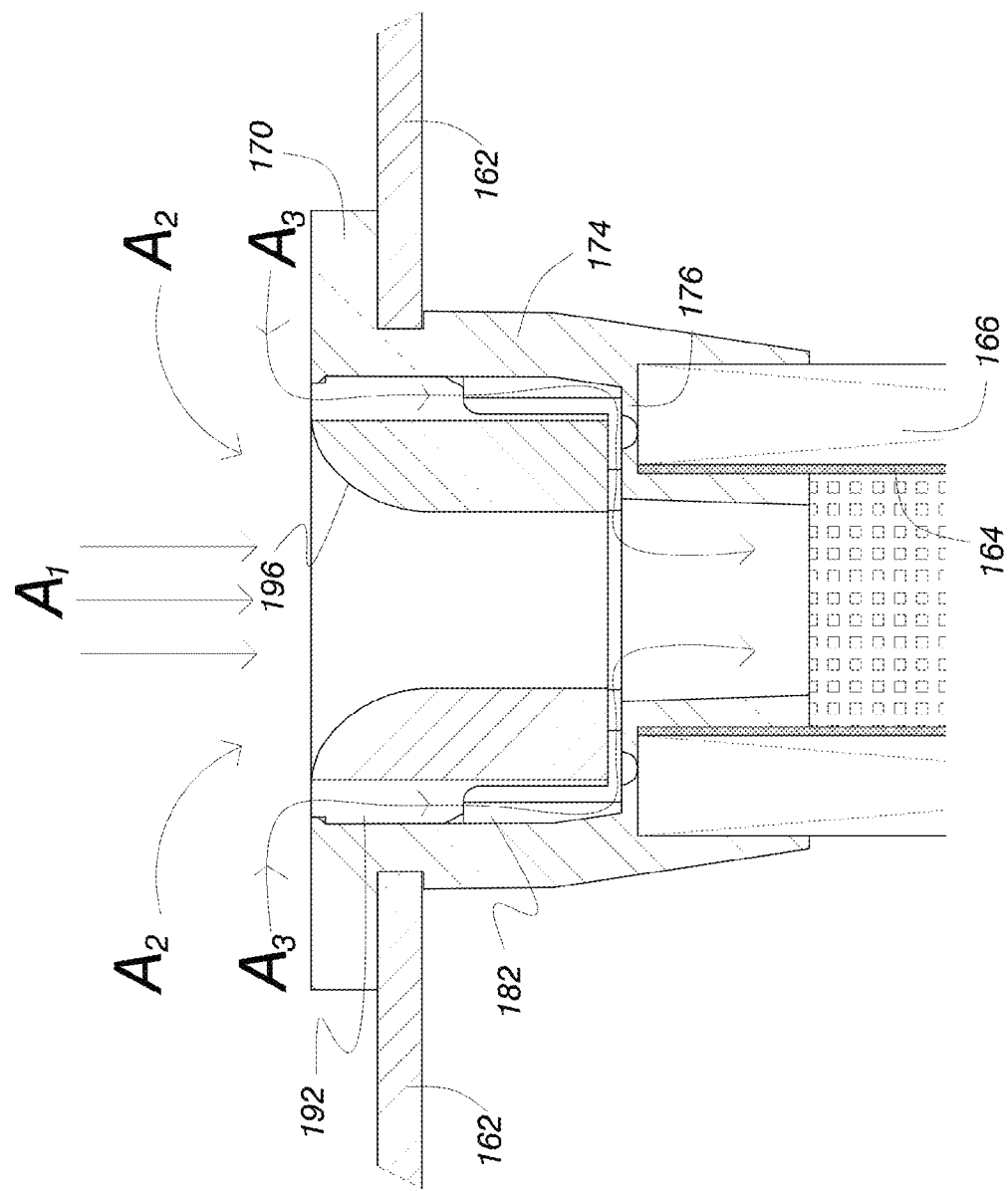
FIG. 33 is a side sectional view through the width of the flow transition insert of FIGS. 28-30 installed in the oblong filter of FIGS. 25-27 to schematically illustrate the flow of primary, secondary and tertiary air flows during a cleaning cycle.

FIG. 33 illustrates the insert 184 installed within the top fitting 168. The insert 184 is supported within the top fitting 168 by the lowermost surface of the annular section 194 resting on the upper surfaces of the pedestals 182. The notch 188 receives the interior ridge 180 of the top fitting 168 to lock the insert 184 in place within the top fitting 168. The outer dimensions of the disk section 186 urge the upper part of the side wall 174 outwardly to seal the groove 172 of the top fitting 168 with the inner surface of the hole in the tube sheet 162. Since the outermost dimensions of the annular section 194 are less than the corresponding dimensions of the side wall 174 and the height of the annular section 194 is less than the height of the support pedestals 182, an air passageway is established between the insert 184 and the interior surfaces of the top fitting 168. More specifically, air can flow through the relief grooves 192, between the outermost dimensions of the annual section 194 and the innermost dimensions of the side wall 174, and between the stepped portion 176 of the top fitting 168 and the lowermost surface of the annual section 194.

In operation, as constructed and assembled as heretofore disclosed, a cleaning cycle will periodically occur to dislodge accumulated dust cake from the exterior surface of the filter media 166. FIG. 33 schematically illustrates the flow of cleaning air. A high pressure blast of cleaning air is delivered as primary air $A_1$ from a blow source (not shown) directed to the mouth of the insert 184. The primary air $A_1$ induces secondary air $A_2$ adjacent the primary air $A_1$ to also enter the mouth of the insert 184 and flow downwardly. The combined flow of primary air $A_1$ and secondary air $A_2$ flowing through the throat of the insert 184 further induces tertiary air $A_3$ to flow through the air passageway previously described to combine with the primary air $A_1$ and secondary air $A_2$ in order to aid the overall cleaning of the filter 160. Accordingly, tertiary air $A_3$ supplies between 5% and 20% additional cleaning air for significantly improved cleaning function of a filter cartridge 160 fitted with the flow transition insert 184 of this invention while, at the same time, significantly improving filtration efficiency and eliminating the need of a separate snap band for sealing the top fitting 168 of the filter 160 to the tube sheet 162.

From the foregoing it will be seen that this invention is one well adapted to attain all the ends and objects hereinabove set forth, together with the other advantages which are obvious and which are inherent to the invention.

It will be understood that certain features and subcombinations are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described my invention, I claim:

1. A high efficiency, filter cartridge to be removably, but sealingly installed in a uniform hole of the tube sheet for a pulse-jet baghouse, said filter cartridge comprising in combination:

an elongate, perforated support conduit having a uniform cross section to provide an internal filter bore and further having first and second ends;

a pleated filter sleeve geometrically circumscribing said support conduit and having first and second ends;

a bottom end cap secured to said second ends of said support conduit and filter sleeve to sealingly close said second ends;

a molded, open mouth top fitting secured to said first ends of said support conduit and filter sleeve, said top fitting having an upper flange configured and sized such that a portion of said flange overlies the tube sheet adjacent said hole therein, said top fitting having a side wall integrally formed with said upper flange to extend downwardly therefrom and being configured and sized to fit through said hole of the tube sheet in which said filter cartridge is installed, and said top fitting having a stepped portion integrally formed with said side wall leading to said filter bore;

a molded, flow transition insert having upper and lower ends received within said open mouth top fitting and having an exterior side surface contacting said side wall of said top fitting, said insert interiorly having a flared open mouth at said upper end thereof with a rounded shoulder transitioning to a throat bore configured and sized at the lower end thereof to substantially correspond to said filter bore; and an air passageway established between said flow transition insert and said top fitting from above said upper flange to said filter bore;

whereby said exterior surface of said insert contacting said side wall of said top fitting urges said side wall outwardly in sealing engagement with said hole of the tube sheet, and said air passageway supplies tertiary air flow to said filter bore during a cleaning cycle with high pressure primary air and induced secondary air delivered to said flared open mouth of said insert.

2. The filter cartridge as in claim 1 wherein said rounded shoulder of said flow transition insert is formed as a smoothly contoured surface with compound radii of curvatures from a horizontal plane substantially defining the opening of said flared mouth to said throat bore.

3. The filter cartridge as in claim 1 wherein said top fitting includes a plurality of molded, radially spaced projections extending upwardly from said stepped portion to limit penetration of said insert to establish a gap between said lower end of said flow transition insert and said stepped portion of said top fitting.

4. The filter cartridge as in claim 3 said flow transition insert including a plurality of radially spaced, vertical relief grooves in said exterior side surface of said insert to establish openings from said upper end of said insert to said gap between said lower end of said flow transition insert and said stepped portion of said top fitting.

5. The filter cartridge as in claim 4 wherein said air passageway is formed by said plurality of radially spaced, vertical relief grooves in said exterior side surface of said insert and said gap between said lower end of said flow transition insert and said stepped portion of said top fitting, whereby said air passageway supplies tertiary air flow to said filter bore during a cleaning cycle with high pressure primary air and induced secondary air delivered to said flared open mouth of said insert.

6. The filter cartridge as in claim 1 wherein said top fitting includes an inwardly projecting ridge around the upper surface of said upper flange and said flow transition insert includes a peripheral notch at the outer edge of said upper end of said insert whereby said notch lockingly receives said projecting ridge when said insert is positioned within said top fitting.

7. The filter cartridge as in claim 1 wherein said top fitting includes an inwardly projecting ridge molded in said side wall at a location beneath said tube sheet when said top fitting is received within the hole of said tube sheet, and said flow transition insert includes a locking groove in said exterior side surface thereof to receive said projecting ridge of said top fitting and to bias outwardly a portion of said side wall of said top fitting beneath said tube sheet to create a material bulge whereby simultaneously said insert is locked within said top fitting and said top fitting is sealingly locked to said tube sheet.

8. The filter cartridge as in claim 1 wherein said top fitting includes an inwardly projecting ridge around the upper surface of said upper flange and said flow transition insert includes a peripheral notch at the outer edge of said upper end of said insert whereby said notch lockingly receives said projecting ridge when said insert is positioned within said top fitting, and wherein said top fitting includes an inwardly projecting bulbous ridge molded in said side wall at a location beneath said tube sheet when said top fitting is received within the hole of said tube sheet, and said flow transition insert includes a camming surface in said exterior side surface thereof to bias outwardly a portion of said side wall of said top fitting beneath said tube sheet to create a material bulge to sealingly lock said top fitting to said tube sheet.

9. The filter cartridge as in claim 1 configured and sized in cross-section as a circular shape.

10. The filter cartridge as in claim 1 configured and sized in cross-section as an oblong shape.

11. A flow transition insert for a stepped-top filter cartridge to be removably, but sealingly installed in a uniform hole of a tube sheet for a pulse-jet baghouse, the filter cartridge including (1) an elongate, perforated support conduit with first and second ends and a uniform cross section to provide an internal filter bore, (2) a pleated filter sleeve with first and second ends and geometrically circumscribing said support conduit, (3) a bottom end cap closing the second ends of the support conduit and filter sleeve, and (4) a molded, open mouth top fitting secured to the first ends of the support conduit and filter sleeve, where the top fitting has an upper flange configured and sized such that a portion thereof overlies the tube sheet adjacent the hole therein, a side wall integrally formed with the upper flange to extend downwardly therefrom and being configured and sized to fit through the tube sheet hole, and a stepped portion integrally formed with the side wall leading to the filter bore; said flow transition insert comprising:

a molded insert having upper and lower ends and sized to substantially fit within said open mouth top fitting, said insert having an exterior side surface contacting said side wall of said top fitting, and insert interiorly having a flared open mouth at said upper end thereof with a rounded shoulder transitioning to a throat bore configured and sized at the lower end thereof to substantially correspond to said filter bore; and an air passageway established between said flow transition insert and said top fitting from above said upper flange to said filter bore;

whereby said exterior surface of said insert contacting said side wall of said top fitting urges said side wall outwardly in sealing engagement with said hole of the tube sheet, and said air passageway supplies tertiary air flow to said filter bore during a cleaning cycle with high pressure primary air and induced secondary air delivered to said flared open mouth of said insert.

12. The flow transition insert as in claim 11 wherein said rounded shoulder of said insert is formed as a smoothly contoured surface with compound radii of curvatures from a horizontal plane substantially defining the opening of said flared mouth to said throat bore.

13. The flow transition insert as in claim 11 wherein said top fitting includes a plurality of molded, radially spaced projections extending upwardly from said stepped portion to limit penetration of said insert to establish a gap between said lower end of said flow transition insert and said stepped portion of said top fitting.

14. The flow transition insert as in claim 13 including a plurality of radially spaced, vertical relief grooves in said exterior side surface of said insert to establish openings from said upper end of said insert to said gap between said lower end of said flow transition insert and said stepped portion of said top fitting.

15. The flow transition insert as in claim 14 wherein said air passageway is formed by said plurality of radially spaced, vertical relief grooves in said exterior side surface of said insert and said gap between said lower end of said flow transition insert and said stepped portion of said top fitting, whereby said air passageway supplies tertiary air flow to said filter bore during a cleaning cycle with high pressure primary air and induced secondary air delivered to said flared open mouth of said insert.

16. The flow transition insert as in claim 11 wherein said top fitting includes an inwardly projecting ridge around the upper surface of said upper flange and said flow transition insert includes a peripheral notch at the outer edge of said upper end of said insert whereby said notch lockingly receives said projecting ridge when said insert is positioned within said top fitting.

17. The flow transition insert as in claim 11 wherein said top fitting includes an inwardly projecting ridge molded in said side wall at a location beneath said tube sheet when said top fitting is received within the hole of said tube sheet, and said flow transition insert includes a locking groove in said exterior side surface thereof to receive said projecting ridge of said top fitting and to bias outwardly a portion of said side wall of said top fitting beneath said tube sheet to create a material bulge whereby simultaneously said insert is locked within said top fitting and said top fitting is sealingly locked to said tube sheet.

18. The flow transition insert as in claim 11 wherein said top fitting includes an inwardly projecting ridge around the upper surface of said upper flange and said flow transition insert includes a peripheral notch at the outer edge of said upper end of said insert whereby said notch lockingly receives said projecting ridge when said insert is positioned within said top fitting, and wherein said top fitting includes an inwardly projecting bulbous ridge molded in said side wall at a location beneath said tube sheet when said top fitting is received within the hole of said tube sheet, and said flow transition insert includes a camming surface in said exterior side surface thereof to bias outwardly a portion of said side wall of said top fitting beneath said tube sheet to create a material bulge to sealingly lock said top fitting to said tube sheet.

19. The flow transition insert as in claim 11 configured and sized in cross-section as a circular shape.

20. The flow transition insert as in claim 11 configured and sized in cross-section as an oblong shape.

* * * * *